(12) United States Patent  
Hirata

(10) Patent No.: US 7,039,626 B2  
(45) Date of Patent: May 2, 2006

(54) INFORMATION PROVIDING APPARATUS

(75) Inventor: Masafumi Hirata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 493 days.

(21) Appl. No.: 10/311,571

(22) PCT Filed: Jul. 5, 2001

(86) PCT No.: PCT/JP01/05862

§ 371 (c)(1),  
(2), (4) Date: Dec. 24, 2002

(87) PCT Pub. No.: WO02/05132

PCT Pub. Date: Jan. 17, 2002

(65) Prior Publication Data

US 2003/0110159 A1    Jun. 12, 2003

(30) Foreign Application Priority Data

Jul. 7, 2000    (JP) ............................. 2000-206360

(51) Int. Cl.  
*G06F 17/30* (2006.01)

(52) U.S. Cl. ..................... 707/1; 707/2; 707/3; 707/9; 707/10; 707/103 R; 707/104.1; 709/206; 709/223; 709/229

(58) Field of Classification Search .................... 707/3, 707/9, 10, 5, 103 R, 100, 104.1, 1, 2; 709/206, 709/223, 224, 229; 713/182, 201  
See application file for complete search history.

(56) References Cited

U.S. PATENT DOCUMENTS

| | | | | |
|---|---|---|---|---|
| 5,542,072 A | * | 7/1996 | Kawashima et al. | 707/10 |
| 5,737,536 A | * | 4/1998 | Herrmann et al. | 709/229 |
| 5,911,143 A | * | 6/1999 | Deinhart et al. | 707/103 R |
| 6,236,996 B1 | * | 5/2001 | Bapat et al. | 707/9 |
| 6,275,825 B1 | * | 8/2001 | Kobayashi et al. | 707/9 |
| 6,449,643 B1 | * | 9/2002 | Hyndman et al. | 709/223 |
| 6,789,195 B1 | * | 9/2004 | Prihoda et al. | 713/182 |
| 2002/0111942 A1 | * | 8/2002 | Campbell et al. | 707/3 |

FOREIGN PATENT DOCUMENTS

| | | |
|---|---|---|
| JP | 4-288650 A | 10/1992 |
| JP | 6-216933 A | 8/1994 |
| JP | 10-341253 A | 12/1998 |

OTHER PUBLICATIONS

Kanai, Hideaki et al., "Ad Hoc-gata Work Flow System no Sekkei", Joho Shori Gakkai Kenkyuu Hokoku, 97-DSM-6, vol. 97, No. 71, pp. 1-6, (1997).

* cited by examiner

*Primary Examiner*—Jeffrey Gaffin  
*Assistant Examiner*—Jacques Veillard  
(74) *Attorney, Agent, or Firm*—Birch, Stewart, Kolasch & Birch, LLP

(57) ABSTRACT

An information providing device assisting the users who meet each other accidentally in forming a community includes a user database (306) managing user information, an information database (307, 309, 310) managing information to be provided to a user, a database management unit (301) for managing information stored in the user database (306) and the information database (307, 309, 310), an information-receiver deciding unit (302) deciding a user who receives information stored in the information database (307, 309, 310) from the user information registered in the user database (306) in accordance with a prescribed condition and providing the user with an access right to information, and an access control unit (303) receiving access from the user and dynamically constructing a page to be displayed for the access based on the information database (307, 309, 310).

14 Claims, 22 Drawing Sheets

FIG.4

```
┌─────────────────────────────────────┐
│      STRAY PET - REGISTRATION       │
├─────────────────────────────────────┤
│  NICKNAME                           │
│  ┌───────────────────────────────┐  │
│  └───────────────────────────────┘  │
│                                     │
│  MAIL ADDRESS                       │
│  ┌───────────────────────────────┐  │
│  └───────────────────────────────┘  │
│                                     │
│  ZIP CODE                           │
│  ┌──────────┐   ┌──────────┐        │
│  └──────────┘ — └──────────┘        │
│                                     │
│  DISTRIBUTION OF PET ARRIVAL NOTIFICATION │
│  ◉WISH  ○NOT WISH                   │
│                                     │
│  DISCLOSURE OF MAIL ADDRESS         │
│  ○DISCLOSE  ◉NOT DISCLOSE           │
│                                     │
│              ┌────────┐ ┌────────┐  │
│              │ RETURN │ │REGISTER│  │
│              └────────┘ └────────┘  │
└─────────────────────────────────────┘
```

FIG.5

| \_\_\_305 |||
|---|---|---|
| POSITION DATABASE |||
| ZIP CODE1 | ZIP CODE2 | POSITION |
| ⋮ | ⋮ | ⋮ |
| 632 | 0002 | WANI-CHO, TENRI-SHI, NARA-KEN |
| 632 | 0003 | IWAYA-CHO, TENRI-SHI, NARA-KEN |
| 632 | 0004 | ICHINOMOTO-CHO, TENRI-SHI, NARA-KEN |
| 632 | 0005 | NARA-CHO, TENRI-SHI, NARA-KEN |
| ⋮ | ⋮ | ⋮ |

USER DATABASE ~306

| USER ID | ZIP CODE1 | ZIP CODE2 | NICKNAME | MAIL ADDRESS | ADDRESS DISCLOSURE | ARRIVAL NOTIFICATION | PET ID | BULLETIN BOARD |
|---|---|---|---|---|---|---|---|---|
| .. | .. | .. | .. | .. | .. | .. | .. | .. |
| 11 | 630 | 0239 | SHIKA-OTOKO | shika@aaa.zzz | 0 | 1 | 35 | 0 |
| 12 | 632 | 0004 | HIRATA | hirata@xxx.yyy | 1 | 1 | 3 | 1 |
| 13 | 630 | 8215 | DAIBUTSU | daibutsu@ccc.zzz | 0 | 0 | -1 | 1 |
| .. | .. | .. | .. | .. | .. | .. | .. | .. |

| PET DATABASE 307 | | | | |
|---|---|---|---|---|
| PET ID | NAME | USER ID | PATH TO DATA REPRESENTING PET | NUMBER OF MOVEMENTS |
| ⋮ | ⋮ | ⋮ | ⋮ | ⋮ |
| 3 | STRAY RABBIT | 12 | http://www.xxx.yyy/norapet/usagi.eva | 112 |
| 4 | STRAY RACOON | 82 | http://www.xxx.yyy/norapet/tanuki.eva | 18 |
| ⋮ | ⋮ | ⋮ | ⋮ | ⋮ |

EVENT DATABASE

| EVENT ID | USER ID | PET ID | TYPE | COMMENT | DATE AND TIME |
|---|---|---|---|---|---|
| .. | .. | .. | .. | .. | .. |
| 1009 | 11 | 3 | 0 | | 2002/05/12 11:49 |
| 1010 | 187 | 13 | 2 | WELL, HOW ABOUT YOU, MAX? | 2002/05/12 15:10 |
| 1011 | 382 | 91 | 1 | SEND ME MAIL | 2002/05/12 15:12 |
| 1012 | 12 | 3 | 0 | ARE YOU MIHHY? | 2002/05/12 15:14 |
| 1013 | 12 | 3 | 2 | I'M STRAY RABBIT. WHAT'S UP? | 2002/05/12 15:14 |
| .. | .. | .. | .. | .. | .. |

803
801
802

INFORMATION PROVIDING APPARATUS

This application is the national phase under 35 U.S.C. § 371 of PCT International Application No. PCT/JP01/05862 which has an International filing date of Jul. 5, 2001, which designated the United States of America.

1. Technical Field

The present invention relates to an information providing device using the Internet, and more particularly to an information providing device that provides information available only for users notified of existence of information and provided with access rights, by a service provider notifying the users of the existence of information and providing the access rights.

2. Background Art

Conventionally, an electronic bulletin board has been utilized as a way to realize communication between users using the Internet.

An electronic bulletin board is a system that allows one-to-many information transmittal rather than one-to-one communications such as email. When a user posts a message on an electronic bulletin board, it becomes viewable to all users that use the electronic bulletin board.

Other than the electronic bulletin board, an email system disclosed in Japanese Patent Laying-Open No. 10-341253 is also available. In this system, it is impossible to predict when and to whom an email sent by the user is distributed, as the email with unknown destination and delivery time is sent anonymously. As a result, a fuzzy communication environment can be constructed.

In the electronic bulletin board, however, the user cannot participate in a community formed there unless the user knows its existence. Therefore the user has to look for an electronic bulletin board to participate in voluntarily and actively, which makes it difficult to form a community through accidental meeting between users.

Furthermore, in the email system in Japanese Patent Laying-Open No. 10-341253, it is impossible to know who receives an email issued by a user and which way it thereafter follows. Therefore it is difficult to form a community between users who share particular email information.

DISCLOSURE OF THE INVENTION

The present invention is made in light of the aforementioned problems and is aimed to provide an information providing device, an information providing method, a computer readable recording medium storing an information providing program, and an information providing system, to assist users who meet each other accidentally in forming a community.

In accordance with an aspect of the present invention, an information providing device that provides a user with information is provided. The information providing device includes: a user database managing user information; an information database managing information to be provided to a user; a database management unit for managing information stored in the user database and the information database; an information-receiver deciding unit deciding a user who receives information stored in the information database from the user information registered in the user database in accordance with a prescribed condition and providing the user with an access right to information; and an access control unit receiving access from the user and dynamically constructing a page to be displayed for the access based on the information database.

A service provider notifies the user of the existence of the information and provides an access right. Therefore, it is possible to provide information available only to the users notified of the existence of the information and provided with the access right and to assist the users who meet each other accidentally in forming a community.

Preferably, the information-receiver deciding unit limits the number of access rights to the same information provided to the same user, in deciding a user who receives an access right to information.

Since the same user is not provided with the same access right many times, the access right can be provided to a variety of users to form a community in a wider range.

In accordance with another aspect of the present invention, an information providing device that provides a user with information is provided. The information providing device includes: a user database managing user information; an information database managing information to be provided to a user; a database management unit for managing information stored in the user database and the information database; a provided-information preparing unit deciding a user who receives information stored in the information database from the user information registered in the user database in accordance with a prescribed condition and preparing information to be provided to the decided user; and an information providing unit sending the prepared information to the decided user.

The user can decide a user who receives information and provide information to that user.

In accordance with the other aspect of the present information, an information providing device that provides a user with information is provided. The information providing device includes: a user database managing user information; an information database managing information to be provided to a user; a database management unit for managing information stored in the user database and the information database; an information-receiver deciding unit deciding a user who receives information stored in the information database from the user information registered in the user database in accordance with a prescribed condition and providing the user with an access right to information; and a mail access control unit receiving an email sent from a user, specifying a user with the email sent from a user for matching with the user decided by the information-receiver deciding unit, and, if there is information to be provided to the user specified by the email, sending the information to be provided to the user by email.

The information can be provided by the email.

In accordance with a further aspect of the present invention, an information providing method is provided for use in an information providing device including a user database managing user information and an information database managing information to be provided to a user. The information providing method includes the steps of: managing information stored in the user database and the information database; deciding a user who receives information in accordance with a prescribed condition for providing an access right to information; and receiving access from the user and dynamically constructing a page to be displayed for the access.

A service provider notifies a user of the existence of information and provides an access right. Therefore it is possible to provide information available only for users notified of the existence of information and provided with access rights, and to assist the users who meet each other accidentally in forming a community.

In accordance with still another aspect of the present invention, a computer readable recording medium stores an information providing program causing a computer to perform the steps of: managing information stored in a user database managing user information and an information database managing information to be provided to a user; deciding a user who receives information in accordance with a prescribed condition for providing an access right to information; and receiving access from the user and dynamically constructing a page to be displayed for the access.

A service provider notifies the user of the existence of information and provides an access right. Therefore it is possible to provide information available only for users notified of the existence of information and provided with access rights, and to assist the users who meet each other accidentally in forming a community.

In accordance with a still further aspect of the present invention, an information providing system includes an information providing device and a terminal device connected to the information providing device over a data communication network.

A service provider notifies the user of the existence of information and provides an access right. Therefore it is possible to provide information available only for users notified of the existence of information and provided with access rights, and to assist the users who meet each other accidentally in forming a community.

BRIEF DESCRIPTION OF THE DRAWINGS

FIG. 4 shows an exemplary web page prepared for a user to register the system use.

FIG. 5 shows an exemplary table structure of a position database 305.

FIG. 6 shows an exemplary table structure of a user database 306.

FIG. 7 shows an exemplary table structure of a pet database 307.

FIG. 8 shows an exemplary table structure of an event database 308.

BEST MODES FOR CARRYING OUT THE INVENTION

In the following, an embodiment of the present invention will be described with reference to the figures.

It is noted that in the present embodiment, a system will be described that assists in communication between users who meet the same electronic pet accidentally by providing information in such a manner as to cause electronic pet data with a bulletin board to wander from users to users.

The application of the method in the present invention, however, is not limited to the system in the present embodiment.

(Description of System Configuration)

Figure 1:
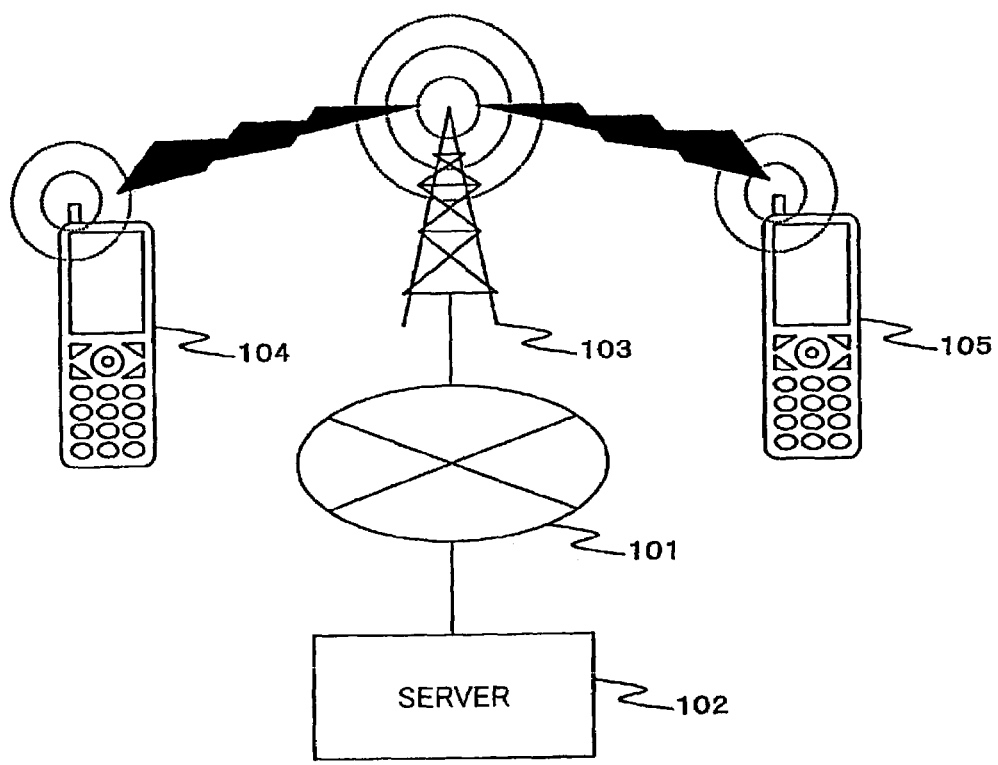
FIG. 1 shows a configuration of an information providing system in accordance with an embodiment of the present invention.

Referring to FIG. 1, an information providing system in accordance with the embodiment of the present invention includes a server 102 connected to a communication network 101 such as the Internet, mobile terminals 104 and 105 connected to the Internet wirelessly and made of a mobile phone, a PHS (Personal Handyphone System) or the like having a function of transmitting an email, viewing a home page and the like, and a communication antenna connected to communication network 101 to be used for mobile terminals 104 and 105 to connect to the Internet wirelessly.

In the following description, a mobile phone is assumed as mobile terminals 104 and 105 which access the Internet to receive an email, view a web page, etc.

It is noted that the system constructed using the method in the present invention may not be used with a mobile phone, and any equipment can take advantage of the system constructed using the method in the present invention as long as it is connected to a communication network and has a function of transmitting an email and viewing a web page.

(Description of Mobile Terminals 104 and 105)

Figure 2:
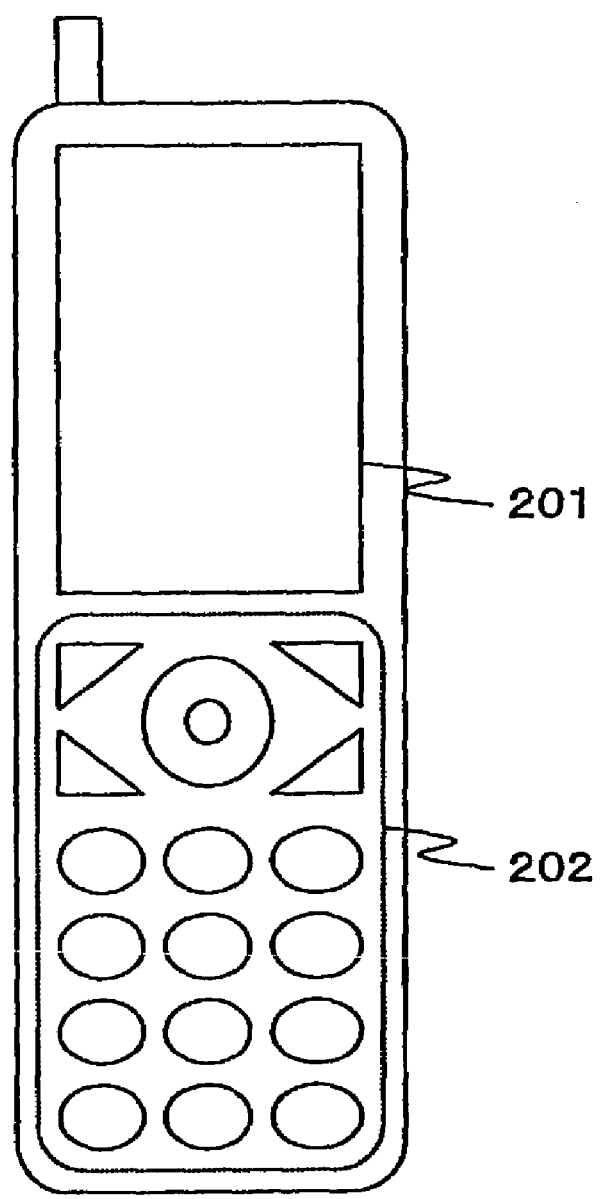
FIG. 2 is an external view of a mobile phone having a function of accessing the Internet.

Referring to FIG. 2, a mobile phone having a function of accessing the Internet includes a display 201 on which an email text, a web page and the like appear, and a user interface 202 such as buttons for use in entering characters, scrolling an image appearing on display 201, and any other various operations.

(Description of Configuration of Server 102)

Figure 3:
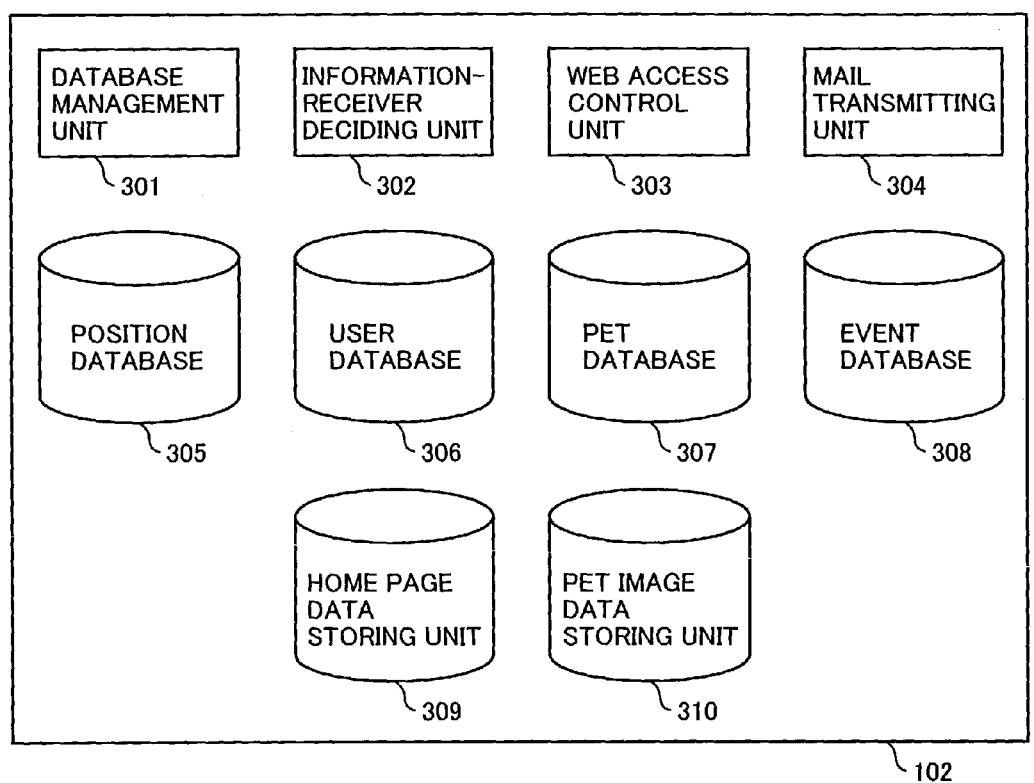
FIG. 3 is a block diagram showing a hardware configuration of server 102.

Referring to FIG. 3, server 102 includes a database management unit 301 managing a variety of data necessary for operating the system as a database, an information-receiver deciding unit 302 deciding a user who next receives an electronic pet data, a web access control unit 303 responsive to a request of a user to view a web page for deciding information to be provided to that user and providing the information as a web page, and an email transmitting unit 304 transmitting an email via the Internet.

Server 102 further includes a position database 305 storing and managing position names in association with codes, a user database 306 storing and managing user information registered in the system, a pet database 307 storing and managing electronic pet information registered in the system, and an event database 308 storing and managing information such as the user who receives the electronic pet, a comment from the user to the electronic pet, and the like.

Server 102 further includes a home page data storing unit 309 storing an HTML (Hyper Text Markup Language) file to display a web page with a web browser and a file for dynamically creating a web page, such as CGI (Common Gateway Interface), and a pet image data storing unit 310 storing image data representing the state of the electronic pet and the like.

The image data stored in pet image data storing unit 310 may be, for example, an image file such as BMP (Bit Map Data), JPEG (Joint Photographic Experts Group), GIF (Graphics Interchange Format), PNG (Portable Network Graphics), an animation file such as EVA (extended Vector Animation), or a program created with Java (R) or the like.

It is noted that the databases described above and a variety of data may be held collectively in one server or may be held dispersedly in a plurality of networked servers.

(Description of User Registration)

The user who wants to utilize the system in the present embodiment first registers himself/herself for use through a home page.

Referring to FIG. 4, the user registers "nickname", "email address", "zip code", "wishing/not wishing for distribution of a pet arrival notification mail" and "disclosing/not disclosing the email address" on a web page for use registration which appears on display 201 of the mobile phone.

"Nickname" is the user's nickname which is displayed on the bulletin board carried by the electronic pet.

"Email address" is the user's email address and is used to provide information from the system to the user.

"Zip code" is used to obtain the user's location. In the present embodiment, this parameter is necessary to control the provided information depending on the user's location. In a case where the location information is not used to control the provided information, however, this parameter is not required. Furthermore, if the user's location can be acquired in another way such as GPS (Global Positioning System), the registration of zip code is not required herein.

"Wishing/not wishing for distribution of a pet arrival notification mail" is a parameter for deciding whether a user is notified by email that an electronic pet becomes accessible from that user, if it is the case.

"Disclosing/not disclosing the email address" is a parameter to set whether a link to transmit an email to the user is established for the user's nickname displayed on the bulletin board.

User information is registered in each database of server 102 by entering information described above and pressing a registration button on the web page.

(Description of Table Structure of Database)

Referring to FIGS. 5 to 8, a table structure of each database managed in server 102 will be described.

Referring to FIG. 5, position database 305 has three attributes: "zip code 1"; "zip code 2"; and "position". "Zip code 1" is an integer representative of the upper three digits of a seven-digit zip code. "Zip code 2" is an integer representative of the lower four digits of the seven-digit zip code. "Position" is a position name (address) corresponding to the combination of zip code 1 and zip code 2.

Referring to FIG. 6, user database 306 has nine attributes: "user ID (identification)"; "zip code 1"; "zip code 2"; "nickname"; "email address"; "address disclosure"; "arrival notification"; "pet ID"; and "bulletin board".

"User ID" is an integer as an identifier which is individually allocated to each user. "Zip code 1" is an integer representative of the upper three digits of the seven-digit zip code representative of the user's location. "Zip code 2" is an integer representative of the lower four digits of the seven-digit zip code representative of the user's location.

"Nickname" is a character string representative of the user's nickname. "Email address" is a character string representative of the user's email address.

"Address Disclosure" is a parameter and a Boolean value for setting whether the user's email address is disclosed on the bulletin board. If the value of the parameter is "0", it means that the email address is not disclosed. If the value of the parameter is "1", it means that the email address is disclosed.

"Arrival notification" is a parameter and a Boolean value for setting whether the user is notified by email that the electronic pet has visited the user. If the value of the parameter is "0", it means that the arrival notification is not made. If the value of the parameter is "1", the arrival notification is made.

"Pet ID" is an integer representative of the ID of the electronic pet that is visiting the user. If the electronic pet is not visiting, it takes on "−1".

The bulletin board is a parameter and a Boolean value for setting the way to display a bulletin board. If the parameter is "0", it means that all of the rows in the bulletin board are displayed. If the parameter is "1", it means that only a row with comment in the bulletin board is displayed.

Referring to FIG. 7, pet database 307 has five attributes: "pet ID"; "name"; "user ID"; "path to data representing a pet"; and "the number of movements".

"Pet ID" is an integer as an identifier which is individually allocated to each electronic pet. "Name" is a character string representative of the name of the electronic pet.

"User ID" is an integer representative of the ID of the user whom the electronic pet is visiting. When the electronic pet is not visiting a user, it takes on "−1".

"Path to data representing a pet" is a character string descriptive of a path to a data file for displaying an image representative of the state of the electronic pet.

"Number of movements" is an integer representative of the number of times the electronic pet has visited the users.

Referring to FIG. 8, event database 308 has six attributes: "event ID"; user ID"; "pet ID"; "type"; "comment"; and "date and time".

"Event ID" is an integer as an identifier which is individually allocated to each event. "User ID" is an integer representative of the ID of the user involving the event. "Pet ID" is an integer representative of the ID of the electronic pet involving the event.

"Type" is an integer representative of the type of the event. If the type is "0", it shows the event generated by an electronic pet visiting a user or a user posting a comment onto the bulletin board of the electronic pet that visits the user. If the type is "1", it shows the event generated by a user posting a comment onto the bulletin board of the electronic pet that visited the user in the past. If the type is "2", it shows the event generated by a statement of an electronic pet.

"Comment" is a character string representative of a content of a statement made by the user or the electronic pet. If the electronic pet just visits the user and makes no statement, it will be a null character string.

"Date and time" is data representative of the date and time when the event is generated.

(Description of Data-Receiver Deciding Algorithm)

A number of methods of deciding the user who receives the electronic pet are contemplated.

The example includes a method of deciding an electronic-pet receiver at random, a method of providing an electronic pet to a user who lives near a user who received the electronic pet last time, a method of providing an electronic pet to a user who has the same interest/preference as a user who received the electronic pet last time, and the like.

Here, a method of deciding an electronic-pet receiver at random, a method of providing an electronic pet to a user who lives near a user who received the electronic pet last time, and a method of deciding a user who receives an electronic pet at random and sending electronic pet information by email will be described.

It is noted that the electronic pet data is assumed to be prepared in advance.

(Description of Method of Deciding Electronic-Pet Receiver at Random)

Figure 9:
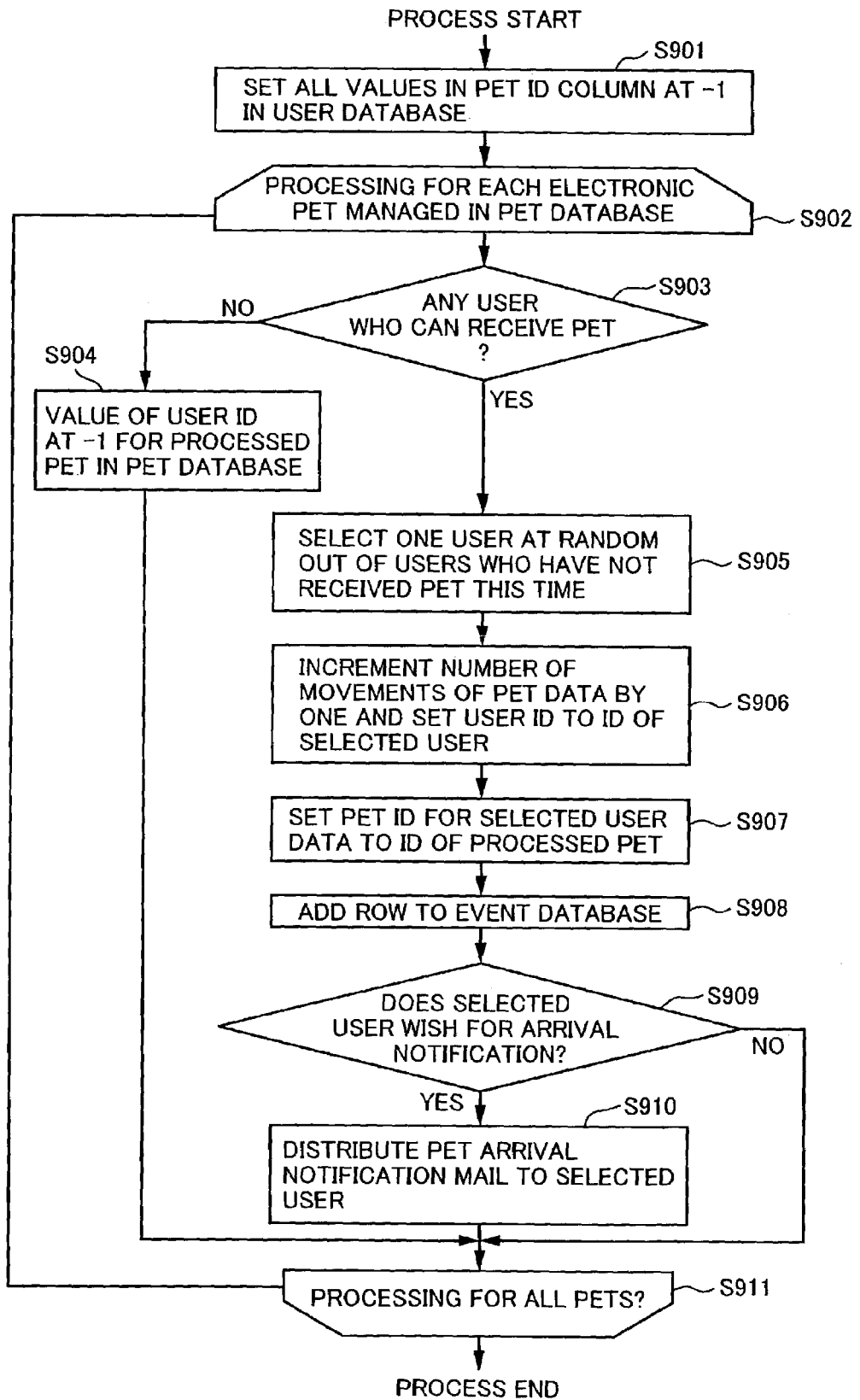
FIG. 9 is a flow chart of a process of deciding a user who receives an electronic pet at random.

Referring to FIG. 9, a method of deciding a user who receives an electronic pet at random will be described.

When the process is started, information-receiver deciding unit 302 sets the value in the column: "pet ID" in user database 306 at "−1" for all the rows (step S901). This causes the state in which no user is provided with an electronic pet.

Step S902 is a loop process that is repeated for all the electronic pet data, that is, all of the rows in pet database 307, and the processing at step S902–S911 is repeated for each row. The repetitive processing may be performed on all the electronic pet data, and the order of the electronic pets to be processed may be at random.

Information-receiver deciding unit 302 determines whether there remains any user who can receive the electronic pet by examining if there is a row in which the value in the column: "pet ID" is "−1" in user database 306 (step S903).

If there is no one who can receive the electronic pet (NO at step S903), information-receiver deciding unit 302 sets the value in the column: "user ID" at "−1" in the row corresponding to the electronic pet data to be processed (step S904). This causes a state in which no user is provided with the electronic pet to be processed. After the end of this step, information-receiver deciding unit 302 determines whether the process ends for all the electronic pet data (S911), and if the process ends for all the electronic pet data, the process is terminated. If the process does not end for all the electronic pet data, step S902 follows to continue the process for the remaining electronic pet data.

If there is a user who can receive the electronic pet (YES at step 903), information-receiver deciding unit 302 selects one user at random out of the users who have not yet received the electronic pet this time (S905). Whether the user has not yet received the electronic pet this time can be determined from whether the value in the column: "pet ID" is "−1" in user database 306.

Information-receiver deciding unit 302 increments the value in the column: "number of movements" by one in the row corresponding to the processed electronic pet data, and sets the selected user's ID in the column: "user ID", in pet database 307 (S906).

Information-receiver deciding unit 302 sets the ID of the processed electronic pet in the column: "pet ID" in the row corresponding to the selected user data, in user database 306 (S907).

Information-receiver deciding unit 302 adds a row indicating that the electronic pet to be processed visited the selected user in event database 308 (S908).

Information-receiver deciding unit 302 determines whether the selected user wishes to be notified by email of the arrival of the electronic pet (S909). Specifically, it is determined by the value in the column: "arrival notification" in user database 306.

If the selected user wishes to be notified of the arrival of the electronic pet by email (YES at S909), email transmitting unit 304 sends the arrival notification mail to the selected user (S910).

If the selected user does not wish to be notified of the arrival of the electronic pet by email (NO at S909), or after the processing at S910, information-receiver deciding unit 302 checks whether the process is completed for all the electronic pet data (S911). If the process ends for all the electronic pet data, the process of deciding the user who receives the electronic pet ends. If the process does not end for all the electronic pet data, returning to step S902, the process continues for the remaining electronic pet data.

With the method described above, it is possible to decide a user who newly receives the electronic pet at random.

(Description of Method of Providing Electronic Pet to User Who Lives Near User Who Received Electronic Pet Last Time)

Figure 10:
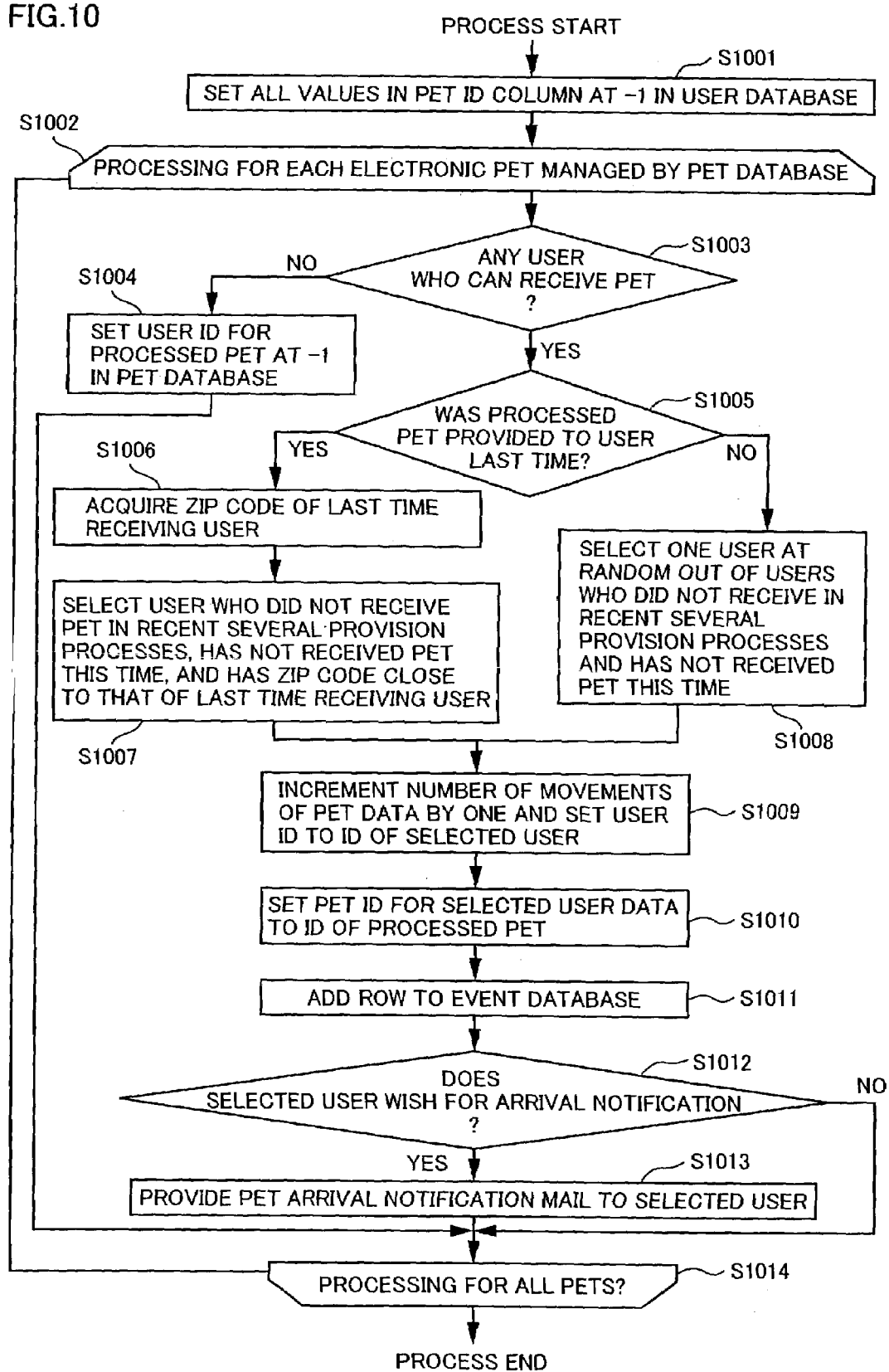
FIG. 10 is a flow chart of a process of providing an electronic pet to a user who lives near a user who received an electronic pet last time.

Referring to FIG. 10, when this process starts, information-receiver deciding unit 302 sets the value in the column: "pet ID" at "−1" for all the rows in user database 306 (S1001). This causes the state in which no user is provided with the electronic pet.

Step S1002 is a loop process that is repeated for all the electronic pet data, that is, all of the rows in pet database 307, and the processing at step S1002–S1014 is repeated. The repetitive processing may be performed for all the electronic pet data, and the order of the processed electronic pet may be at random.

Information-receiver deciding unit 302 determines whether there remains a user who can receive the electronic pet by checking there is a row in which the value in the column: "pet ID" is "−1" in the user database (step S1003).

If there is no one who can receive the electronic pet (NO at S1003), information-receiver deciding unit 302 sets the value in the column: "user ID" in the row corresponding to the electronic pet data to be processed at "−1" in pet database 307 (S 1004). This causes the state in which no user is provided with the electronic pet to be processed. After the end of this step, information-receiver deciding unit 302 determines whether the process ends for all the electronic pet data (S1014), and if the process ends for all the electronic pet data, the process of deciding a user who receives the electronic pet ends. If the process does not end for all the electronic pet data, step S1002 follows to continue the processing for the remaining electronic pet data.

If there is a user who can receive the electronic pet (YES at S1003), information-receiver deciding unit 302 determines whether the electronic pet data to be processed was provided to a user in the provision process last time (S1005). Specifically, if the value in the column: "user ID" is "−1" in the corresponding row in pet database 307, the electronic pet data was not provided to a user last time. If the value is not "−1", it shows that the electronic pet data was provided to a user last time.

If the electronic pet data was provided to a user last time (YES at S1005), information-receiver deciding unit 302 acquires the zip code of the user who received that electronic pet data last time. Specifically, it obtains the value in the column: "user ID" in the corresponding row in pet database 307 and then acquires the values of "zip code 1" and "zip code 2" in the row in which the user ID in user database 306 is equal to the value obtained from pet database 307 (S1006).

Information-receiver deciding unit 302 selects a user who has not received the processed electronic pet data in the recent several provision processes, has not yet received the electronic pet, and has a zip code close to the zip code of the last time receiving user (S1007). The recent several times is a value that can be set arbitrarily and is set at a large value in order to avoid providing the same electronic pet data to the same user many times.

Whether the electronic pet data is provided to a certain user in the recent several provisions can be examined from event database 308, and whether it is not yet provided this time can be determined from whether the value in the column: "pet ID" in user database 306 is "−1". Furthermore, the user who has the zip code close to that of the user who received last time can be selected by referring to the columns "zip code 1" and "zip code 2" in the user database.

If the processed electronic pet data was not provided to a user last time (NO at S1005), information-receiver deciding unit 302 selects one user at random out of the users who have not received the processed electronic pet data in the recent several provision processes and has not yet received the electronic pet this time (S1008).

After S1007 or S1008, information-receiver deciding unit 302 increments the value in the column: "number of movements" by one in the row corresponding to the processed electronic pet data and sets the value in the column: "user ID" to the selected user's ID (S1009).

Information-receiver deciding unit 302 sets the ID of the processed electronic pet in the column: "pet ID" in the row corresponding to the selected user data (S1010).

Information-receiver deciding unit 302 adds a row indicating that the processed electronic pet has visited the selected user in event database 308 (S1011).

Information-receiver deciding unit 302 determines whether the selected user wishes to be notified of the arrival of the electronic pet by email (S1012). Specifically, it is determined from the value in the column: "arrival notification" in user database 306.

If the selected user wishes to be notified of the arrival of the electronic pet by email (YES at S1012), email transmitting unit 304 sends the arrival notification mail to the selected user (S1013).

If the selected user does not wish to be notified of the arrival of the electronic pet by email (NO at S1012), or after S1013, information-receiver deciding unit 302 checks whether the process is completed for all the electronic pet data (S1014). If the process is completed for all the electronic pet data, the process of deciding the user who receives the electronic pet ends. If the process is not completed for all the electronic pet data, returning to S1002, the processing continues for the remaining electronic pet data.

With the method described above, it is possible to decide a user who newly receives the electronic pet data from the location of the user who received the electronic pet data last time.

By periodically performing the processes as described above in information-receiver deciding unit 302, such a state is created in that the electronic pet data wanders from users to users.

Other than these information providing methods, for example, the electronic pet moving among the users in the same generation, the electronic pet moving among the users having the same interest, and the like can be easily realized by registering the user's age and interest at the time of user registration.

(Method of Deciding User Who Receives Electronic Pet at Random and Sending Electronic Pet Information by Email)

Figure 11:
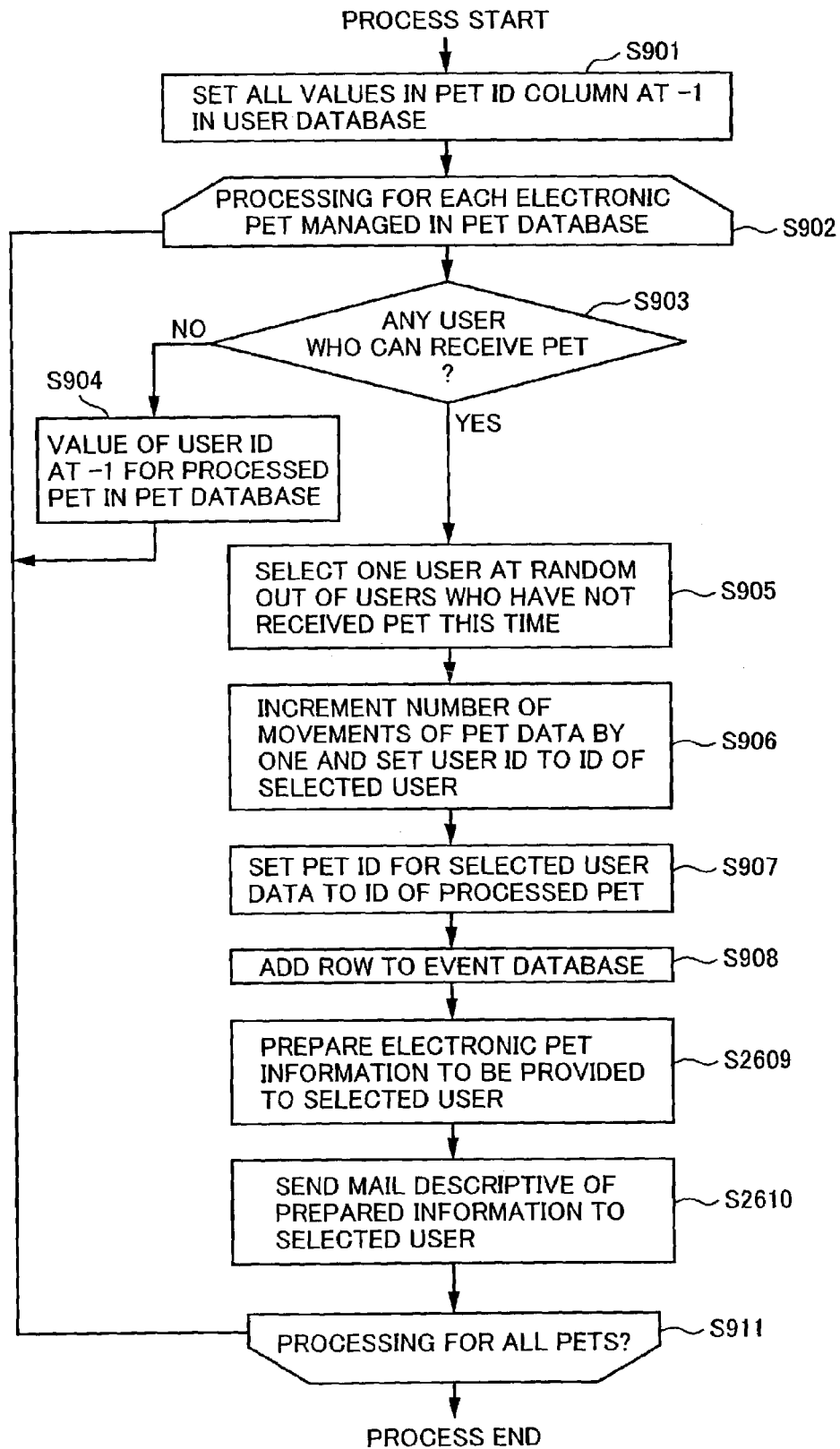
FIG. 11 is a flow chart of a process of deciding a user who receives an electronic pet at random and sending electronic pet information by email.

Referring to FIG. 11, this method is for carrying out the processing at S2609 and S2610 instead of processing at S909 and S910 in the method described with reference to FIG. 9. The remaining processing is similar to that shown in FIG. 9. Therefore the detailed description thereof will not be repeated here.

At S2609, mail transmitting unit 304 prepares information of the electronic pet to be provided to the selected user. At S2610, mail transmitting unit 304 sends a mail descriptive of the prepared information to the selected user.

(Description of Electronic Pet Arrival Notification Mail)

Figure 12:
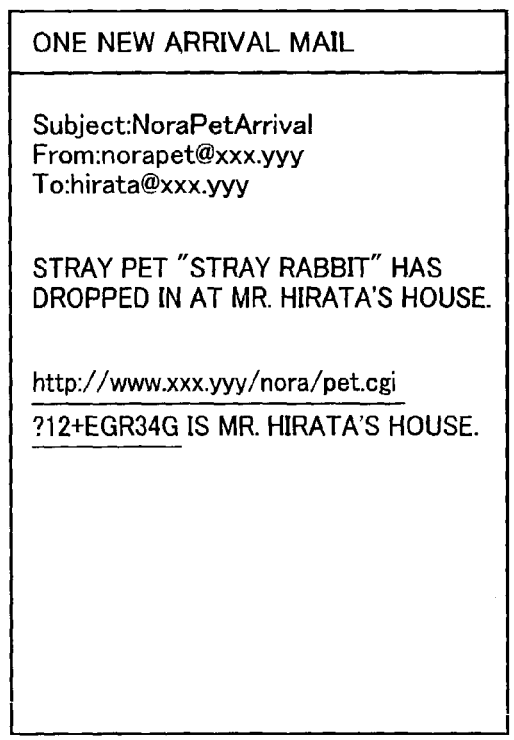
FIG. 12 shows an exemplary electronic pet arrival notification mail sent to a user.

Referring to FIG. 12, an exemplary electronic pet arrival notification mail sent to the user will be described. Here it is assumed that the arrival notification mail appears on display 201 of the mobile phone.

The email text describes 'stray pet "stray rabbit" has dropped in at Mr. Hirata's house http://www.zzz.yyy/nora/pet.cgi?12+EGR34G is Mr. Hirata's house.' "Hirata" is the user's nickname, and "stray rabbit" is the name of the electronic pet. The portion of "http://www.zzz.yyy/nora/pet.cgi?12+EGR34G" is the web page address for viewing the electronic pet data provided to the user.

(Description of Accessing Web Browser)

The user can view the provided electronic pet data by accessing the web page illustrated in FIG. 12.

Figure 13:
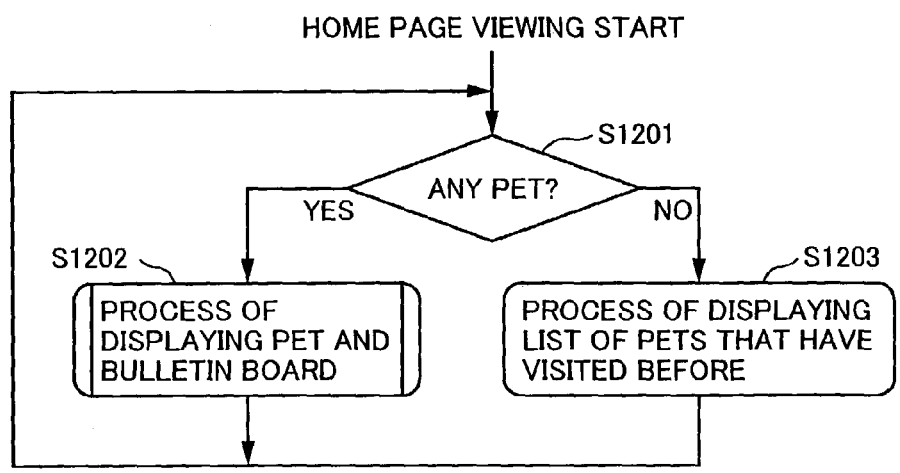
FIG. 13 is a flow chart of a process of dynamically configuring and displaying a web page accessed by a user.

Referring to FIG. 13, the process of dynamically configuring and displaying the web page accessed by the user will be described.

When the user starts viewing the home page, web access control unit 303 determines whether the electronic pet data is provided to that user (S1201).

Whether the electronic pet data is provided to the user can be determined by examining user database 306. Specifically, the column: "pet ID" in the row corresponding to the user is examined. If it is not "−1", it can be determined that the electronic pet is provided, and if "−1", the electronic pet is not provided. It is assumed that the user ID that specifies the user who accessed the web page is set in the web page address.

If the electronic pet data is provided to the user (YES at S1201), web access control unit 303 allows the electronic pet and the bulletin board to appear on display 201 (S1202). This process will be described later. Thereafter, S1201 returns.

If the electronic pet data is not provided to the user (NO at S1201), a list of electronic pets that have visited the user before appears on display 201 (S1203). Thereafter, S1201 returns.

(Description of Process of Displaying Electronic Pet and Bulletin Board)

Figure 14:
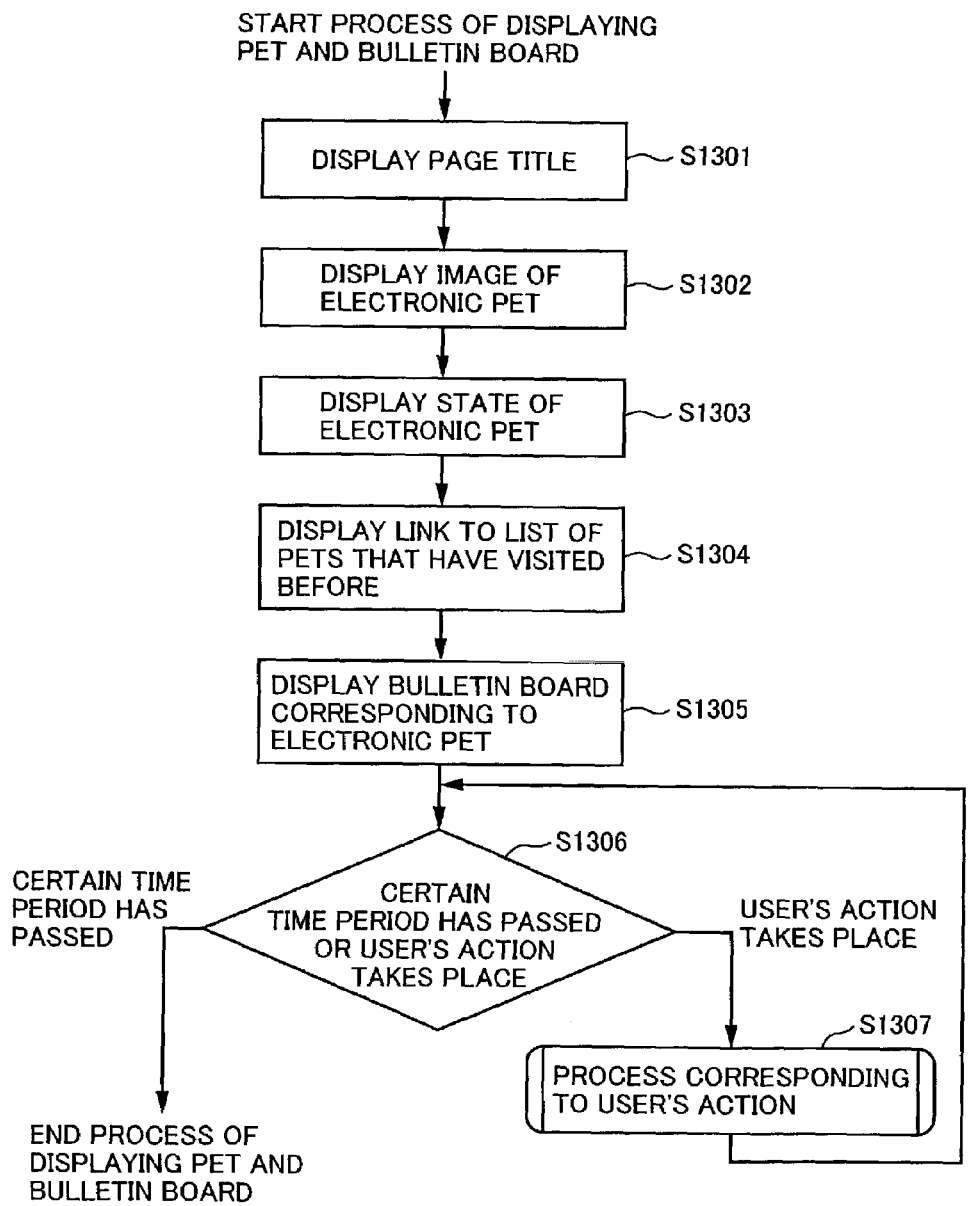
FIG. 14 is a flow chart of a process of displaying an electronic pet and a bulletin board.
Figure 15:
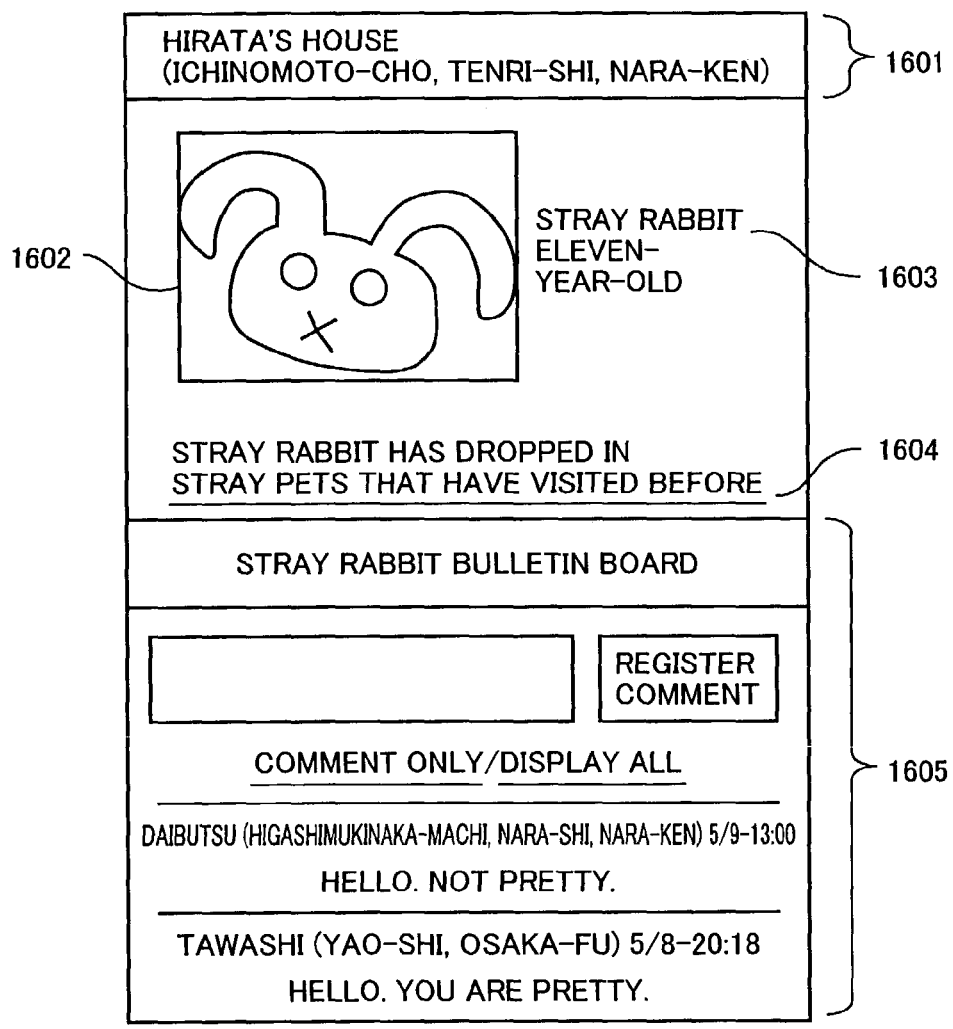
FIG. 15 shows the image of the electronic pet that visits a user and the display of the bulletin board.

Referring to FIGS. 14 and 15, the process of displaying the electronic pet and the bulletin board on display 201 (S 1202 in FIG. 13) will be described in detail.

The title 1601 of the page appears on display 201 (S1301). Here, "Hirata's house (Ichinomoto-cho, Tenri-shi, Nara-ken)" is displayed as a title. "Hirata" here is the user's nickname, and "Ichinomoto-cho, Tenri-shi, Nara-ken" is the user's location.

This data can be obtained from position database 305 and user database 306. The data as described above can be obtained, for example, by referring to row 501 in position database 305 in FIG. 5 and row 601 in user database 306 in FIG. 6.

The image 1602 of the electronic pet that visits the user appears on display 201. This data is obtained from user database 306 and pet database 307. For example, the ID of the electronic pet that visits the user is obtained from the value in the column: "pet ID" in row 601 in user database 306 in FIG. 6, and data representative of the electronic pet image is obtained by referring to the column: the path to data representing a pet in row 701 in pet database 307 in FIG. 7.

The electronic pet state 1603 appears on display 201. Here "eleven-year-old stray rabbit" appears. "Stray rabbit" is the name of the electronic pet and "eleven-year-old" is a value decided from the number of times the electronic pet moves. The displayed image of the electronic pet can be controlled using this value. This data can be obtained from pet database 307. For example, the name of the electronic pet is obtained from the column: name in row 701 in pet database 307 in FIG. 7, and the number of times the electronic pet moves among users is obtained from the column: "the number of movements".

The link 1604 to the page on which a list of electronic pets that have visited the user before appears on display 201 (S1304). The method of configuring a linked page will be described later.

Bulletin board 1605 corresponding to the electronic pet appears on display 201 (S1305). This data is obtained from event database 308. For example, the bulletin board data is obtained by selecting a row relevant to the currently processed electronic pet, stray rabbit (pet ID=3), as row 801 in event database 308 in FIG. 8. Note that the volume of selected data is controlled as appropriate, since data volume may be extremely large if all the relevant rows are selected from the event database.

If the user permits the disclosure of his/her email address, a link to initiate a mailer (an email software) for sending an email to the user is set for the character string of the nickname displayed on the bulletin board. Whether the user discloses his/her email address can be obtained from user database 306.

There are two ways to display the bulletin board, which can be switched over, and the processing at this point will be described later.

Web access control unit 303 waits until a certain time period has passed after the page being displayed or the user takes some action (step S1306). If a certain time period has passed (a certain time period has passed at S1306), the process in FIG. 14 is ended, and step S1201 in FIG. 13 returns. This is to handle the case where the electronic pet leaves the user or a new electronic pet has come because of the processing in FIG. 10, during the display of the web page. If the user's action takes place (the user's action takes place at S1306), the process corresponding to the user's action is carried out (step S1307). The detail of this process will be described later.

Providing information to the user is not limited to the access to the web page, and information may be provided using email.

Figure 16:
FIG. 16 shows an exemplary electronic pet notification mail sent to a user.

FIG. 16 is an exemplary electronic pet notification mail sent to the user.

The email text describes "stray pet "stray rabbit" has dropped in at Mr. Hirata's house. Please send an email to the following address: mailto:norapet@www.zzz.yyy."

When the user who has received the mail sends a mail to norapet@www.zzz.yyy, a server that has received the mail decides a user from a sender address, and if there is any information provided to that user, it returns the content of the information to the user by email.

Figure 17:
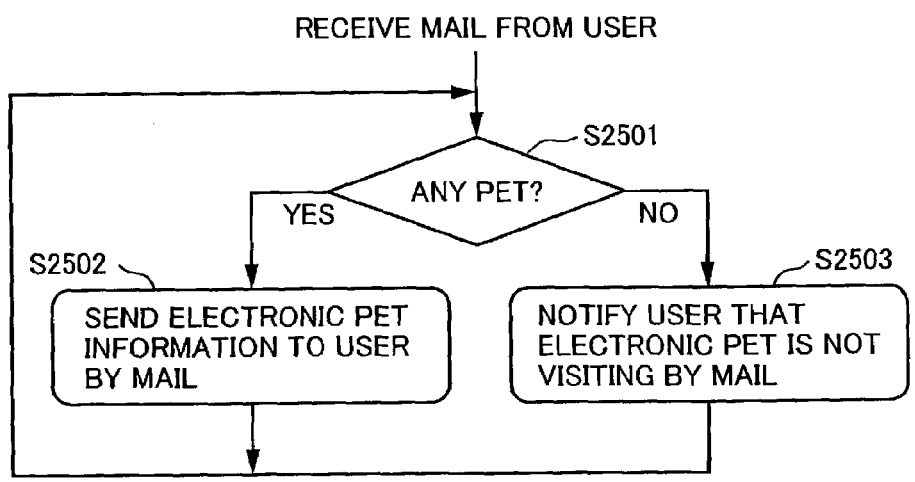
FIG. 17 is a flow chart of a process of providing information using email.

Referring to FIG. 17, the process of providing information using email will be described.

When receiving an email from the user, mail transmitting unit 304 specifies the user from the email sender address and determines whether electronic pet data is provided to that user (S2501). If electronic pet data is provided to the user (YES at S2501), mail transmitting unit 304 notifies the user of information on the electronic pet by email (S2502). If electronic pet data is not provided to the user (NO at S2501), it notifies the user that an electronic pet does not visit by email (S2503).

(Description of Process Corresponding to User's Action)

Figure 18:
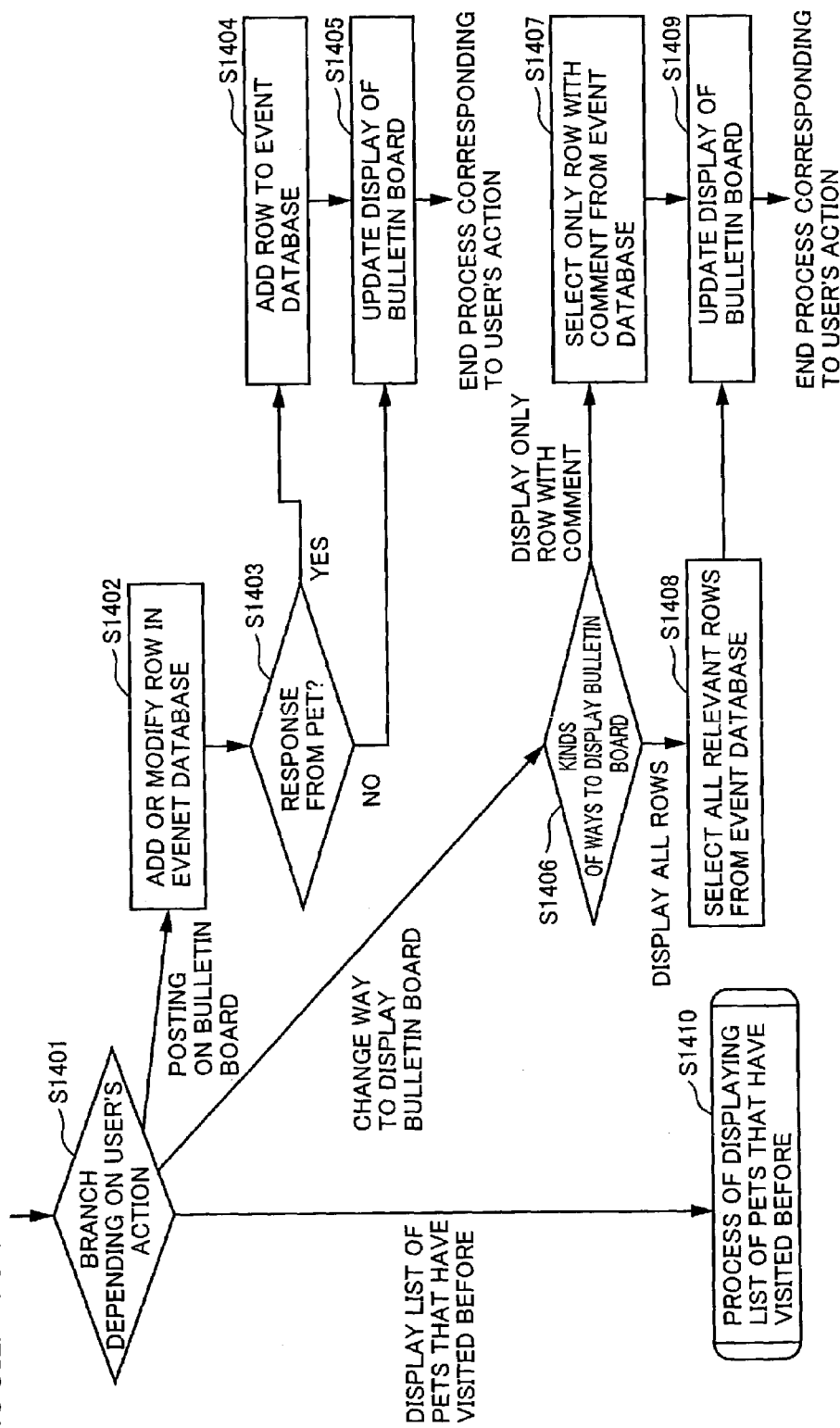
FIG. 18 is a flow chart of a process in a case where the user takes some action for the displayed web page.

Referring to FIG. 18, the process in a case where the user takes some action for the displayed web page (S1307 in FIG. 14) will be described.

Web access control unit 303 examines what action the user takes (S1401).

Figure 19:
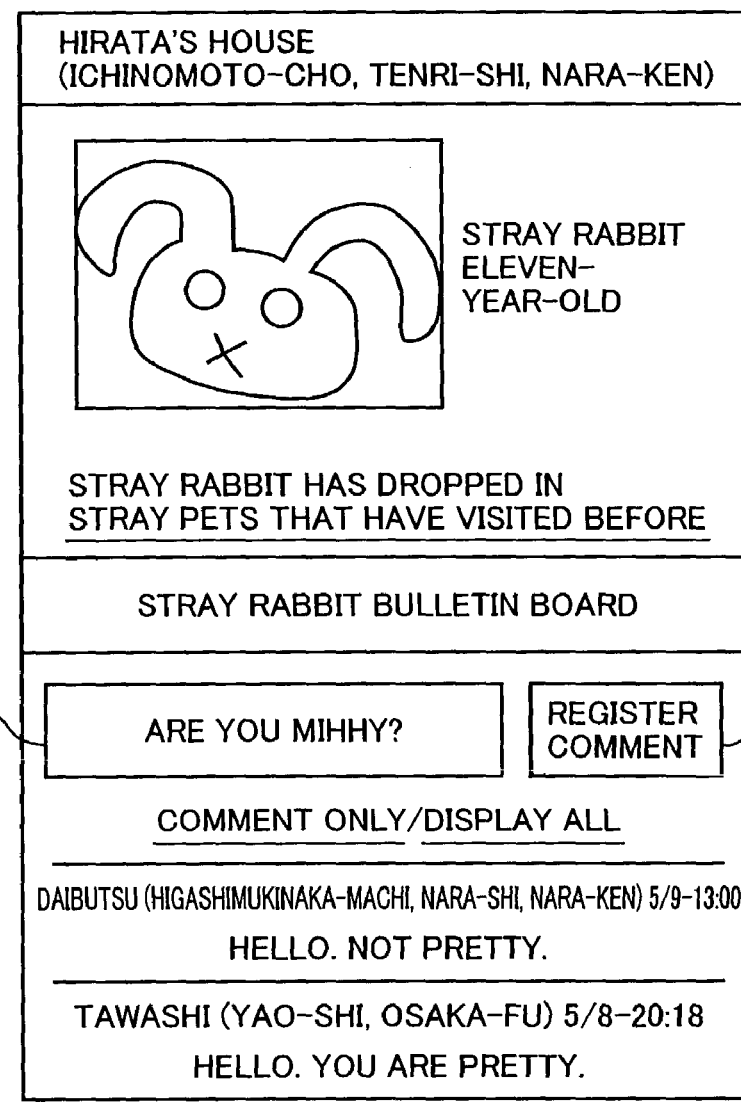
FIG. 19 shows a display at the time of the user posting onto the bulletin board.

If the user's action is posting on the bulletin board (posting on the bulletin board at S1401), web access control unit 303 adds or modifies a row in event database 308 (S1402). For example, referring to FIG. 19, the posting onto the bulletin board is performed by the user entering a comment in a field 1701 and pressing a "register comment" button 1702. If this posting is the first time for the electronic pet that has visited the user, as described with reference to step S908 in FIG. 9, a row has already been added in event database 308 and therefore that row is updated. In other cases, a new row is added in event database 308.

Web access control unit 303 determines whether the electronic pet responds to the user's posting onto the bulletin board (S1403). The response of the electronic pet may occur each time or at random, or may not occur at all.

The content of the response of the electronic pet may be created with the conventionally known artificial intelligence and the like, or it may be selected from a predetermined pattern.

The content of the user's reply to the question from the electronic pet may be managed as a user profile and provided as a material to determine one who receives the electronic pet later.

If there is a response from the electronic pet (YES at S1403), a row corresponding to the electronic pet's statement is added to event database 308 (S1404).

Row 802 in event database 308 in FIG. 8 is an exemplary row representative of the event corresponding to the electronic pet's statement. That this row is the electronic pet's statement can be determined from the value in the column: type being 2.

After step S1404, or if there is no response from the electronic pet (NO at S1403), the display of the bulletin board is updated (S1405). More specifically, the bulletin board is re-displayed with a newly added event. After this process ends, the process corresponding to the user's action ends, and step S1306 in FIG. 14 returns.

Figure 20:
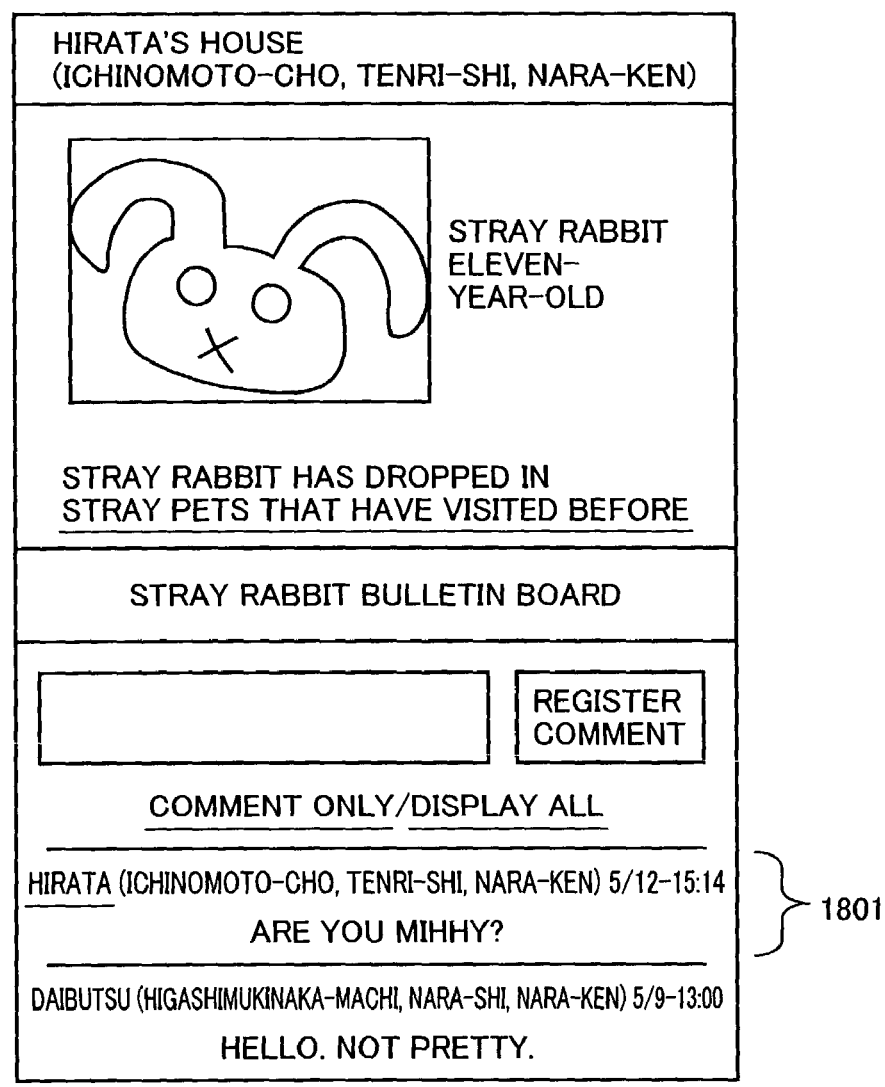
FIG. 20 shows a display after the posting onto the bulletin board.
Figure 21:
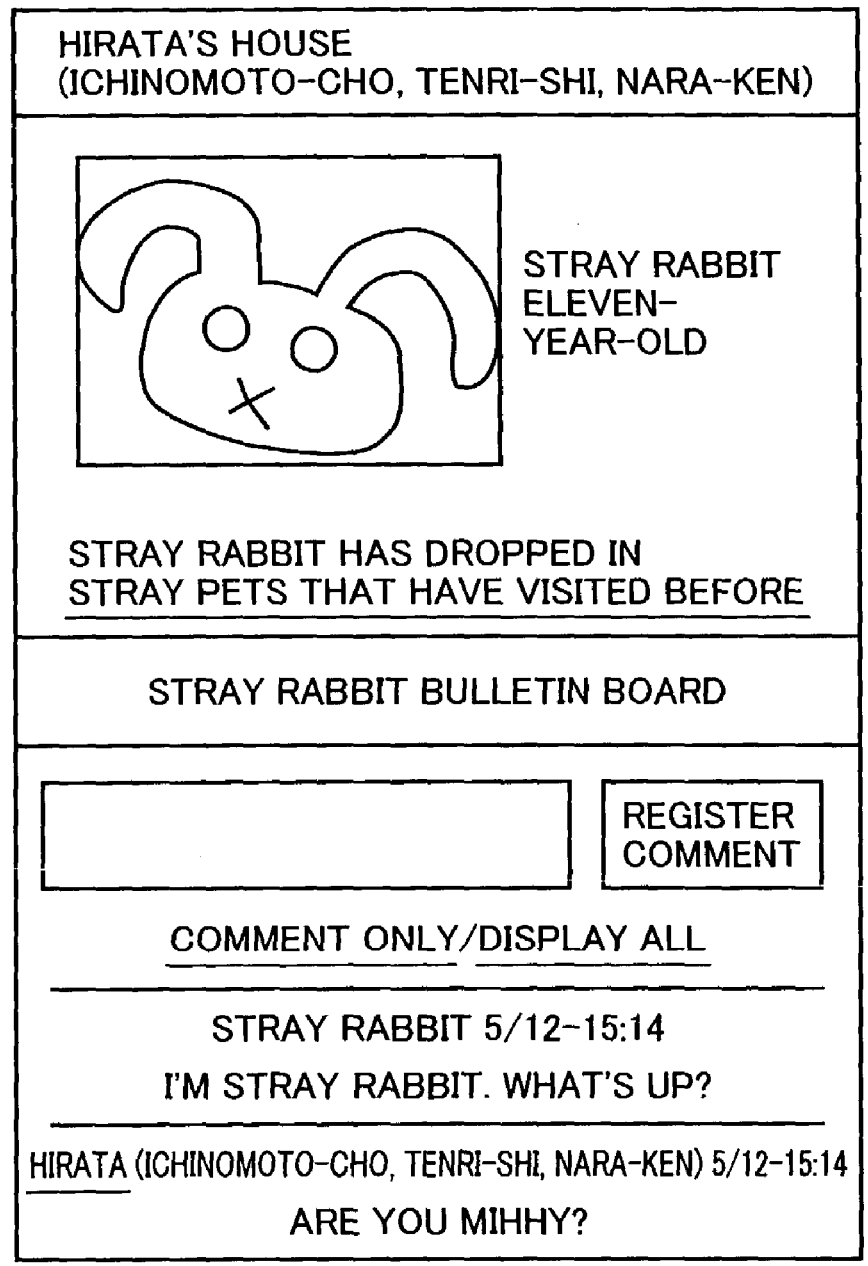
FIG. 21 shows a display in a case where there is a statement of an electronic pet on the bulletin board.

FIG. 20 shows the display of the bulletin board where the user's statement takes place, with a new statement being displayed in a field 1801. FIG. 21 shows the display of the bulletin board where the electronic pet's statement further takes place, with the electronic pet's statement being displayed in a field 1901.

If the user's action is to change the way to display the bulletin board (change the way to display the bulletin board at S1401), web access control unit 303 examines the way to display the bulletin board that is selected by the user (S1406). The way to display the bulletin board is set for each user and used at the time of displaying the following other bulletin boards. The column: bulletin board in user database 306 is data for setting the way to display the bulletin board.

If the user selects to display only a row with comment on the bulletin board (display only a row with comment at S1406), database management unit 301 selects only a row with comment from event database 308 to configure information to be displayed on the bulletin board (S1407).

If the user selects to display all the rows on the bulletin board (display all the rows at S1406), all the rows including the row without comment are selected from event database 308 and information to be displayed on the bulletin board is configured (S1408). Row 803 in event database 308 is an exemplary row without comment.

After step S1407 or S1408, the display of the bulletin board is updated (S1409).

Figure 22:
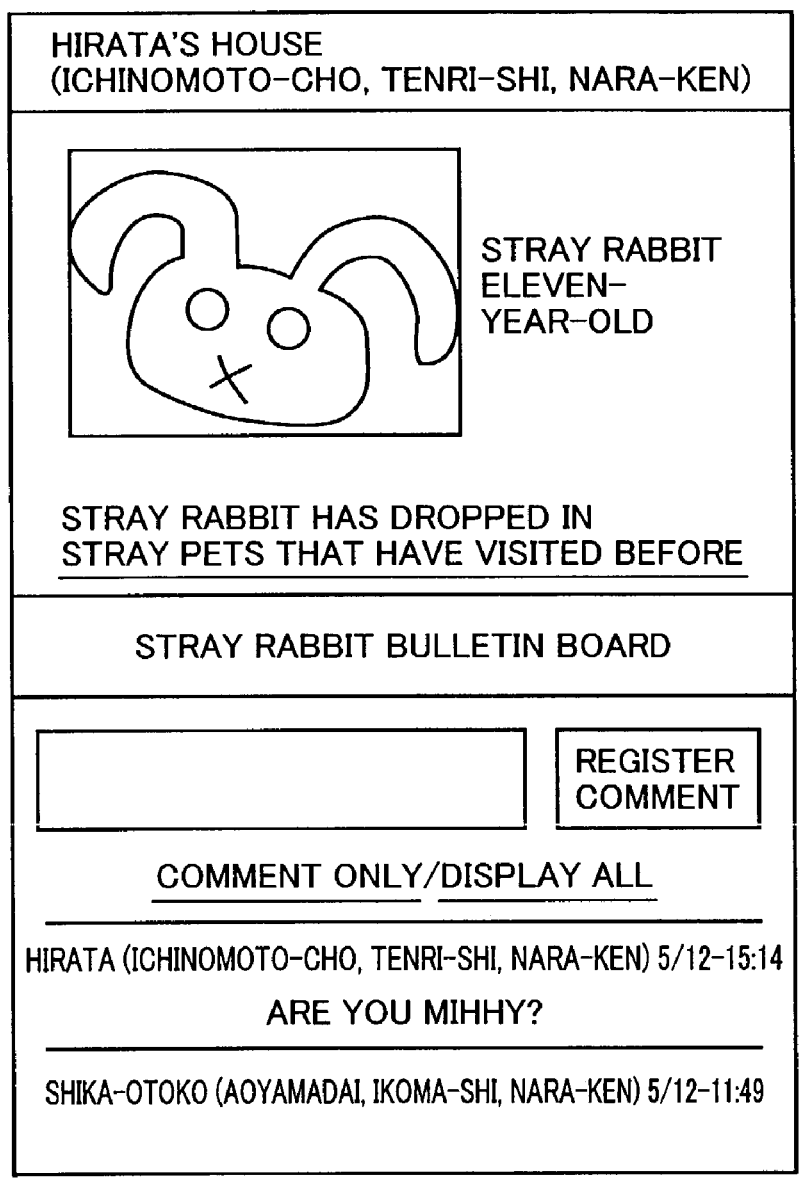
FIG. 22 shows the bulletin board in a mode of displaying a row that does not include a comment.

FIG. 22 is an exemplary bulletin board as being set to display the rows including the row without comment. A row without comment is displayed in a field 2001. By displaying the rows including the row without comment, it can be grasped which way the electronic pet follows and which user it meets before arriving here.

After the processing at S1409 ends, the process corresponding to the user's action is ended, and step S1306 in FIG. 14 returns.

If the user's action is to display a list of electronic pets that have visited before (display a list of electronic pets that have visited before at S1401), the process for displaying a list of electronic pets that have visited before is performed (S1410). The detail of this process will be described below.

(Description of Process of Displaying List of Electronic Pets that have Visited Before)

Figure 23:
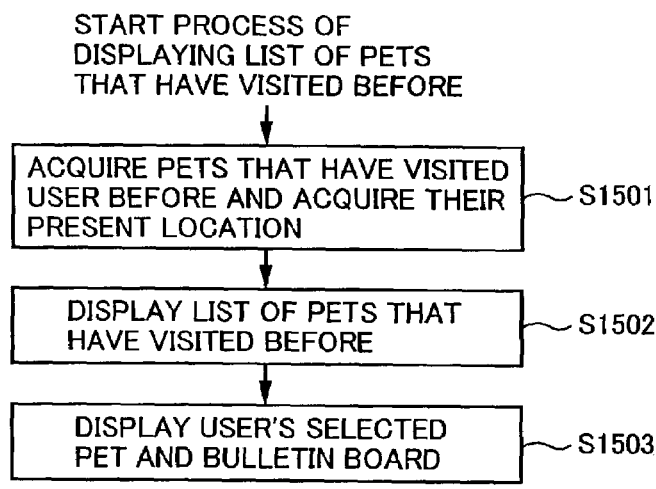
FIG. 23 is a flow chart of a process of displaying a list of electronic pets that have visited before.

Referring to FIG. 23, the process of displaying a list of electronic pets that have visited before (S1410 in FIG. 18) will be described.

Web access control unit 303 acquires the electronic pets that have visited the user before and acquires their present locations (S1501). This is obtained by extracting a row associated with a specific user from event database 308, selecting the electronic pets that the user has met, selecting users whom these electronic pets visit in the latest state, and obtaining each user's location from user database 306 and position database 305.

Web access control unit 303 displays a list of electronic pets that have visited the user on display 201 (S1502). If the number of electronic pets that have visited the electronic pets is large, the displayed number may be limited in such a form as 10 pets that have lately visited.

Figure 24:
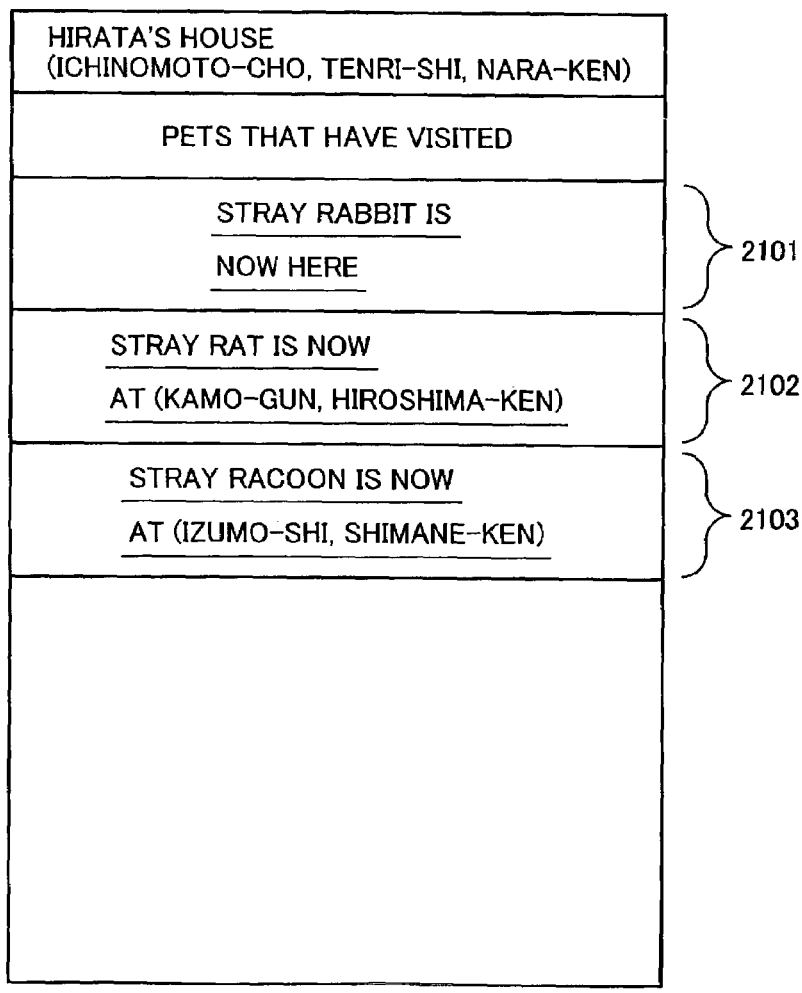
FIG. 24 shows an exemplary display of the list of electronic pets that have visited the user.

FIG. 24 is an exemplary display of the list of electronic pets that have visited the user.

Field 2101 shows the electronic pet that now visits the user, with the comment "stray rabbit is now here" being displayed.

Fields 2102 and 2103 show the electronic pets that have visited the user before, with the comment being displayed in the form of "stray rat is now at (Kamo-gun, Hiroshima-ken). The link to the web page that displays the bulletin board for each electronic pet is set in each comment.

Web access control unit 303 then displays the bulletin board of the electronic pet that corresponds to the link selected by the user from the displayed list of electronic pets that have visited, on display 201 (S1503).

If the selected electronic pet is that electronic pet which now visits the user, a web page is displayed in accordance with the flow chart in FIG. 14 as described above.

If the selected pet is that electronic pet which visited the user in the past, a web page is also displayed in accordance with the flow chart in FIG. 14 as describe above, with some processing being added. The detail thereof will be described later.

(Description of Processing When Electronic Pet is not Coming)

At step S1201 of the flow chart in FIG. 13, if the electronic pet is not visiting the user, a list of electronic pets that have visited the user before is displayed through the processing at step S1203.

At step S1203, the process of displaying the title of the page at step S1301 in FIG. 14 is first performed and the process for displaying a list of electronic pets that have visited before in FIG. 23 is then performed.

Figure 25:
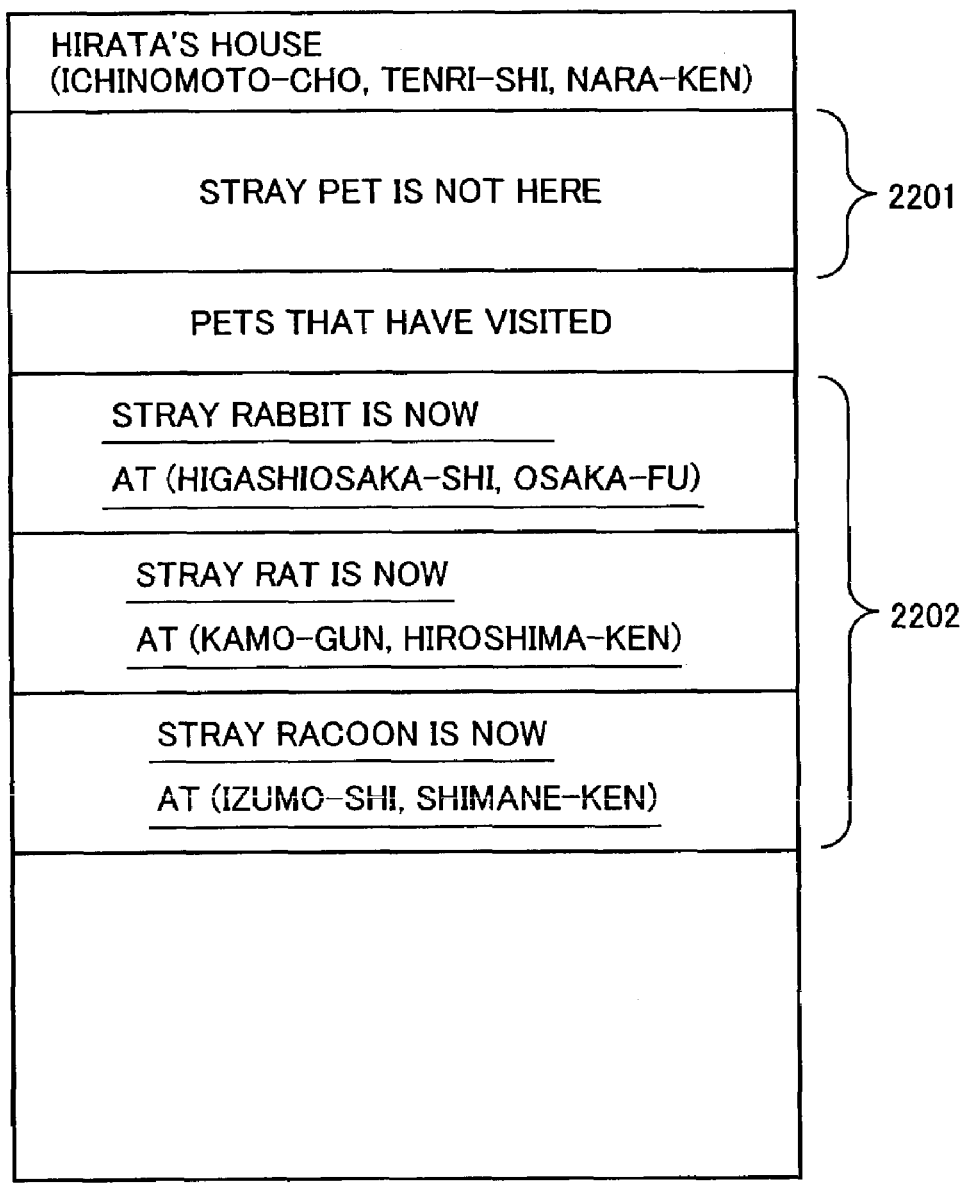
FIG. 25 shows a display in a case where an electronic pet is not at the user.

The display in the case where the electronic pet is not at the user is as shown in FIG. 25. A comment indicating that the electronic pet is not at the user is displayed in a field 2201, and a list of electronic pets that have visited the user before is displayed in a field 2202. By following the link that is set in the character string of the electronic pet that has visited before, the user can access the bulletin board of that electronic pet.

(Description of Process of Displaying Bulletin Board of Electronic Pet that Visited the User in the Past)

This processing is performed in accordance with the flow chart shown in FIG. 14 as described above, except that the process of displaying the electronic pet's present location is added in the process of displaying the state of the electronic pet at S1303.

Figure 26:
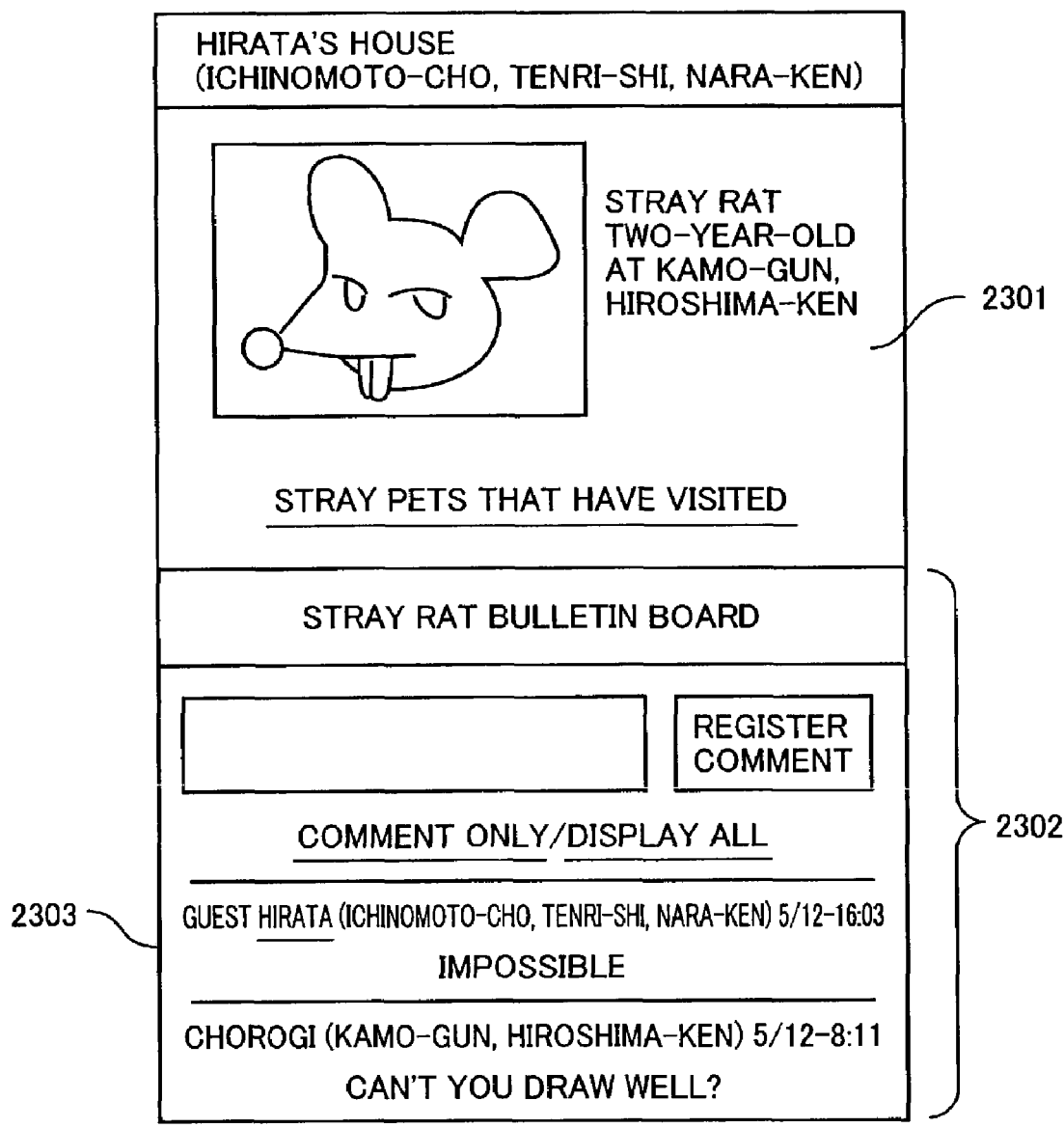
FIG. 26 shows a display of the electronic pet that visited the user in the past with the bulletin board.

FIG. 26 is an exemplary display of the bulletin board of the electronic pet that visited the user in the past. The electronic pet's present location is displayed in a field 2301.

The processing associated with bulletin board 2302 is performed in accordance with the flow chart in FIG. 18, except that "guest" is displayed prior to the nickname of the user (statement maker) who was met in the past as shown in a field 2303, in order to distinguish the statement of the user whom the electronic pet now visits from the statement of the user whom the electronic pet met in the past.

The kinds of statements are distinguished by referring to the column: type in event database 308. It the type is 1, it means the statement of the user who was met in the past. This is set when an event is added at step 1404 in FIG. 18.

In the information providing system describe above, the users who meet each other accidentally share the same electronic pet to facilitate forming a community among users.

Furthermore, the electronic pet moves among the users who live in close vicinity in real life, so that it is possible to form a virtual community on the Internet, which is likely to develop into a real community.

In accordance with the present invention, since the users who meet each other accidentally are assisted in forming a community. Therefore it is possible to provide information available only for the users who are notified of the existence and provided with the access right by a service provider notifying the user of the existence of the information and providing the user with an access right.

It is noted that although information provision using a web access and email has been described in the present embodiment, the method of providing information is not limited to these two and an instant message or the other method of providing information may be used.

Industrial Applicability

As described above, the present invention is suitable to assist users having a common interest or preference or users who meet each other accidentally in forming a community and to provide a meeting place on the communication network.

The invention claimed is:

1. An information providing device that provides a user with information, comprising:
   a user database (306) managing user information;
   an information database (307, 309, 310) managing information to be provided to a user;
   a database management unit (301) for managing information stored in said user database (306) and said information database (307, 309, 310);
   an information-receiver deciding unit (302) each time deciding a user who receives information stored in said information database (307, 309, 310) from the user information registered in said user database (306) in accordance with the user information stored in the user database (306) and providing the user with an access right to information; and
   an access control unit (303) receiving access from the user and dynamically constructing a page to be displayed for said access based on said information database (307, 309, 310).

2. The information providing device according to claim 1, further comprising a mail transmitting unit notifying a user that an access right to information is provided by email.

3. The information providing device according to claim 1, wherein
   said information-receiver deciding unit limits the number of times that said information is to be provided when the same information is to be provided to the same user, in selecting a user to be provided said information.

4. The information providing device according to claim 1, further comprising an event database managing an event created by provision of information or access from the user.

5. The information providing device according to claim 4, wherein
   said event database stores a history of providing information to a user and a user's comment for information provided to the user.

6. The information providing device according to claim 5, wherein
   said access control unit selects, for information that is provided to the user and for each information that was provided to the user in the past, an event associated with that information from said event database through said database management unit and provides the user with a display of a list.

7. An information providing device that provides a user with information, comprising:
   a user database managing user information for a plurality of users;
   an information database managing information to be provided to a user;
   a database management unit for managing information stored in said user database and said information database;
   an information-receiver deciding unit selecting a user from said plurality of users to be provided information stored in said information database from the user information registered in said user database in accordance with a prescribed condition and preparing said information to be provided; and
   an access control unit receiving an access request from the selected user, determining whether the selected user has an access right to said information, and if the selected user has the access right dynamically constructing a page to be displayed for said information, wherein
   said information-receiver deciding unit provides a user who lives close to said user who was provided with the access right to certain information last time with an access right to that information by priority, in selecting a user to be provided information.

8. An information providing device that provides a user with information, comprising:
   a user database (306) managing user information;
   an information database (307, 309, 310) managing information to be provided to a user;
   a database management unit (301) for managing information stored in said user database (306) and said information database (307, 309, 310);
   an information-receiver deciding unit (302) deciding a user who receives information stored in said information database (307, 309, 310) from the user information registered in said user database (306) in accordance with a prescribed condition and providing the user with an access right to information; and
   an access control unit (303) receiving access from the user and dynamically constructing a page to be displayed for said access based on said information database (307, 309, 310), wherein
   said information-receiver deciding unit (302) provides a user having an interest/preference similar to that of a user who was provided with an access right to certain information last time with an access right to that information by priority, in deciding a user who receives an access right to information.

9. An information providing device that provides a user with information, comprising:
   a user database managing user information for a plurality of users;
   an information database managing information to be provided to a user;
   a database management unit for managing information stored in said user database and said information database;
   an information-receiver deciding unit selecting a user from the plurality of users to be provided information stored in said information database from the user information registered in said user database in accordance with a prescribed condition and preparing said information to be provided; and
   an access control unit receiving an access request from the selected user, determining whether the selected user has an access right to said information, and if the selected user has the access right dynamically constructing a page to be displayed for said information, wherein
   said access control unit, in response to the access request from the user, displays that information if the user is now provided with information, and displays a list of information provided in the past if the user is not provided with information now.

10. The information providing device according to claim 9, further comprising an event database managing an event created by provision of information or access from the user.

11. An information providing device that provides a user with information, comprising:
- a user database managing user information for a plurality of users;
- an information database managing information to be provided to a user;
- a database management unit for managing information stored in said user database and said information database;
- an information-receiver deciding unit selecting a user from the plurality of users to be provided information stored in said information database from the user information registered in said user database in accordance with a prescribed condition and preparing said information to be provided;
- an access control unit receiving an access request from the selected user, determining whether the selected user has the access right to said information, and if the selected user has the access right dynamically constructing a page to be displayed for said information; and
- position database managing a position in association with a corresponding code, wherein
- said access control unit includes
- a circuit for selecting an event related to certain information from said event database through said database management unit,
- a circuit for selecting a position where the selected event is created from said position database through said database management unit, and
- a circuit for displaying positions to which the certain information has been distributed before.

12. An information providing method for use in an information providing device including a user database (306) managing user information and an information database (307, 309, 310) managing information to be provided to a user, said method comprising the steps of:
- managing information stored in said user database (306) and said information database (307, 309, 310) (S901, S902, S911, S1001, S1002, S1014);
- each time deciding a user who receives information in accordance with the user information stored in the user database (306) for providing an access right to information (S903–S910, S1003–S1013, S2609, S2610); and
- receiving access from the user and dynamically constructing a page to be displayed for said access (S1201–S1203, S1301–S1307, S1401–S1410, S1501–S1503).

13. A computer readable recording medium storing an information providing program causing a computer to perform the steps of:
- managing information stored in a user database (306) managing user information and an information database (307, 309, 310) managing information to be provided to a user (S901, S902, S911, S1001, S1002, S1014);
- each time deciding a user who receives information in accordance with the user information stored in the user database (306) for providing an access right to information (S903–S910, S1003–S1013, S2609, S2610); and
- receiving access from the user and dynamically constructing a page to be displayed for said access (S1201–S1203, S1301–S1307, S1401–S1410, S1501–S1503).

14. An information providing system, comprising:
- an information providing device (102); and
- a terminal device (104, 105) connected to said information providing device (102) over a data communication network (101), wherein
- said information providing device (102) includes
- a user database (306) managing user information;
- an information database (307, 309, 310) managing information to be provided to a user;
- a database management unit (301) for managing information stored in said user database (306) and said information database (307, 309, 310);
- an information-receiver deciding unit (302) each time deciding a user who receives information stored in said information database (307, 309, 310) from the user information registered in said user database (306) in accordance with the user information stored in the user database (306) and providing the user with an access right to information; and
- an access control unit (303) receiving access from the user and dynamically constructing a page to be displayed for said access based on said information database (307, 309, 310).

* * * * *

UNITED STATES PATENT AND TRADEMARK OFFICE
CERTIFICATE OF CORRECTION

| | | |
|---|---|---|
| PATENT NO. | : 7,039,626 B2 | |
| APPLICATION NO. | : 10/311571 | |
| DATED | : May 2, 2006 | |
| INVENTOR(S) | : Masafumi Hirata | |

It is certified that error appears in the above-identified patent and that said Letters Patent is hereby corrected as shown below:

Col. 15, line 14,

Claim 1:
" 1. An information providing device that provides a user with information, comprising: a user database (306) managing user information; an information database (307, 309, 310) managing information to be provided to a user; a database management unit (301) for managing information stored in said user database (306) and said information database (307, 309, 310); an information-receiver deciding unit (302) each time deciding a user who receives information stored in said information database (307, 309, 310) from the user information registered in said user database (306) in accordance with the user information stored in the user database (306) and providing the user with an access right to information; and an access control unit (303) receiving access from the user and dynamically constructing a page to be displayed for said access based on said information database (307, 309, 310). "

Should read:
--1. An information providing device that provides a user with information, comprising:
   a user database managing user information for a plurality of users;
   an information database managing information to be provided to a user;
   a database management unit for managing information stored in said user database and said information database;
   an information-receiver deciding unit each time selecting a user to be provided information stored in said information database from the user information registered in said user database in accordance with the user information or said plurality of users stored in the user database and preparing said information to be provided; and
   an access control unit receiving an access request from the selected user, determining whether the selected user has an access right to said information, and if the selected user has the access right dynamically constructing a page to be displayed for said information.--

UNITED STATES PATENT AND TRADEMARK OFFICE
CERTIFICATE OF CORRECTION

PATENT NO.        : 7,039,626 B2
APPLICATION NO. : 10/311571
DATED             : May 2, 2006
INVENTOR(S)       : Masafumi Hirata It is certified that error appears in the above-identified patent and that said Letters Patent is hereby corrected as shown below:

Col. 16, line 17,

Claim 8:
"8. An information providing device that provides a user with information, comprising: a user database (306) managing user information; an information database (307, 309, 310) managing information to be provided to a user; a database management unit (301) for managing information stored in said user database (306) and said information database (307, 309, 310); an information-receiver deciding unit (302) deciding a user who receives information stored in said information database (307, 309, 310) from the user information registered in said user database (306) in accordance with a prescribed condition and providing the user with an access right to information; and an access control unit (303) receiving access from the user and dynamically constructing a page to be displayed, for said access based on said information database (307, 309, 310), wherein said information-receiver deciding unit (302) provides a user having an interest/preference similar to that of a user who was provided with an access right to certain information last time with an access right to that information by priority, in deciding a user who receives an access right to information."

Should Read:
--8. An information providing device that provides a user with information, comprising:
   a user database managing user information for a plurality of users;
   an information database managing information to be provided to a user;
   a database management unit for managing information stored in said user database and said information database;
   an information-receiver deciding unit selecting a user from the plurality of users to be provided information stored in said information database from the user information registered in said user database
in accordance with a prescribed condition and preparing said information to be provided; and
   an access control unit receiving an access request from the selected user, determining whether the selected user has an access right to said information and if the selected user has the access right dynamically constructing a page to be displayed for said information, wherein
   said information-receiver deciding unit provides a user having an interest/ preference similar to that of the user who was provided with an access right to certain information last time with an access right to that information by priority, in the selected user to be provided information.--

UNITED STATES PATENT AND TRADEMARK OFFICE
CERTIFICATE OF CORRECTION

| | |
|---|---|
| PATENT NO. | : 7,039,626 B2 |
| APPLICATION NO. | : 10/311571 |
| DATED | : May 2, 2006 |
| INVENTOR(S) | : Masafumi Hirata |

It is certified that error appears in the above-identified patent and that said Letters Patent is hereby corrected as shown below:

Col. 17, line 35,

Claim 12:
"12. An information providing method for use in an information providing device including a user database (306) managing user information and an information database (307, 309, 310) managing information to be provided to a user, said method comprising the steps of: managing information stored in said user database (306) and said information database (307, 309, 310) (S901, S902, S911, S1001, S1002, S1014): each time deciding a user who receives information in accordance with the user information stored in the user database (306) for providing an access right to information (S903 S910, S1003 S1013, S2609, S2610); and receiving access from the user and dynamically constructing a page to be displayed for said access (S1201 S1203, S1301 S1307, S1401 S1410, S1501 S1503)."

Should read:
--12. An information providing method for use in an information providing device including a user database managing user information for a plurality of users and an information database managing information to be provided to a user, said method comprising the steps of:
managing information stored in said user database and said information database;
each time selecting a user to be provided information in accordance with the user information stored in the user database for preparing said information to be provided; and
receiving an access request from the selected user, determining whether the selected user has an access right to said information, and if the selected user has the access right dynamically constructing a page to be displayed for said information.--

Col. 18, line 5,

Claim 13:
" 13. A computer readable recording medium storing an information providing program causing a computer to perform the steps of: managing information stored in a user database (306) managing user information and an information database (307, 309, 310) managing information to be provided to a user (S901, S902, S911, S1001, S1002, S1014); each time deciding a user who receives information in accordance with the user information stored in the user database (306) for providing an access right to information (S903 S910, S1003 S1013, S2609, S2610); and receiving access from the user and dynamically constructing a page to be displayed for said access (S1201 S1203, S1301 S1307, S1401 S1410, S1501 S1503)."

UNITED STATES PATENT AND TRADEMARK OFFICE
CERTIFICATE OF CORRECTION

| | | |
|---|---|---|
| PATENT NO. | : 7,039,626 B2 | |
| APPLICATION NO. | : 10/311571 | |
| DATED | : May 2, 2006 | |
| INVENTOR(S) | : Masafumi Hirata | |

It is certified that error appears in the above-identified patent and that said Letters Patent is hereby corrected as shown below:

Col. 18, line 5,

Should read:
   --13. A computer readable recording medium storing an information providing program causing a computer to perform the steps of:
   managing information stored in a user database managing user information for a plurality of users and an information database managing information to be provided to a user;
   each time selecting a user to be provided information in accordance with the user information stored in the user database for preparing said information to be provided; and
   receiving an access request from the selected user, determining whether the selected user has an access right to said information, and if the selected user has the access right dynamically constructing a page to be displayed for said information.--

Col. 18, line 22,

Claim 14:
" 14. An information providing system, comprising: an information providing device (102); and a terminal device (104, 105) connected to said information providing device (102) over a data communication network (101), wherein said information providing device (102) includes a user database (306) managing user information; an information database (307, 309, 310) managing information to be provided to a user; a database management unit (301) for managing information stored in said user database (306) and said information database (307, 309, 310); an information-receiver deciding unit (302) each time deciding a user who receives information stored in said information database (307, 309, 310) from the user information registered in said user database (306) in accordance with the user information stored in the user database (306) and providing the user with an access right to information; and an access control unit (303) receiving access from the user and dynamically constructing a page to be displayed for said access based on said information database (307, 309, 310)."

UNITED STATES PATENT AND TRADEMARK OFFICE
CERTIFICATE OF CORRECTION

PATENT NO. : 7,039,626 B2
APPLICATION NO. : 10/311571
DATED : May 2, 2006
INVENTOR(S) : Masafumi Hirata It is certified that error appears in the above-identified patent and that said Letters Patent is hereby corrected as shown below:

Col. 18, line 22,

Should read:
--14. An information providing system, comprising:
an information providing device; and
a terminal device connected to said information providing device over a data communication network, wherein
said information providing device includes
a user database managing user information for a plurality of users;
an information database managing information to be provided to a user;
a database management unit for managing information stored in said user database and said information database;
an information-receiver deciding unit each time selecting a user to be provided information stored in said information database from the user information registered in said user database in accordance with the user information of said plurality of users stored in the user database and preparing said information to be provided; and
an access control unit receiving an access request from the selected user, determining whether the selected user has an access right to said information, and if the selected user has the access right dynamically constructing a page to be displayed for said information. --

Signed and Sealed this

Eighth Day of May, 2007

JON W. DUDAS
*Director of the United States Patent and Trademark Office*

UNITED STATES PATENT AND TRADEMARK OFFICE
CERTIFICATE OF CORRECTION

PATENT NO.        : 7,039,626 B2
APPLICATION NO.   : 10/311571
DATED             : May 2, 2006
INVENTOR(S)       : Masafumi Hirata It is certified that error appears in the above-identified patent and that said Letters Patent is hereby corrected as shown below:

Claim 8:
"8. An information providing device that provides a user with information, comprising:
a user database managing user information for a plurality of users;
an information database managing information to be provided to a user,
a database management unit for managing information stored in said user database and said information database;
an information-receiver deciding unit selecting a user from the plurality of users to be provided information stored in said information database from the user information registered in said user database
in accordance with a prescribed condition and preparing said information to be provided; and
an access control unit receiving an access request from the selected user, determining whether the selected user has an access right to said information and if the selected user has the access right dynamically constructing a page to be displayed for said information, wherein
said information-receiver deciding unit provides a user having an interest/ preference similar to that of the user who was provided with an access right to certain information last time with an access right to that information by priority, in the selected user to be provided information."

Should read
--8. An information providing device that provides a user with information, comprising:
a user database managing user information for a plurality of users;
an information database managing information to be provided to a user,
a database management unit for managing information stored in said user database and said information database;
an information-receiver deciding unit selecting a user from the plurality of users to be provided information stored in said information database from the user information registered in said user database
in accordance with a prescribed condition and preparing said information to be provided; and
an access control unit receiving an access request from the selected user, determining whether the selected user has an access right to said information and if the selected user has the access right dynamically constructing a page to be displayed for said information, wherein

UNITED STATES PATENT AND TRADEMARK OFFICE
CERTIFICATE OF CORRECTION

PATENT NO. : 7,039,626 B2
APPLICATION NO. : 10/311571
DATED : May 2, 2006
INVENTOR(S) : Masafumi Hirata It is certified that error appears in the above-identified patent and that said Letters Patent is hereby corrected as shown below:

Should read (cont'd)
said information-receiver deciding unit provides a user having an interest/ preference similar to that of the user who was provided with an access right to certain information last time with an access right to that information by priority, in selecting the user to be provided information.--

Signed and Sealed this

Eleventh Day of September, 2007

JON W. DUDAS
*Director of the United States Patent and Trademark Office*